United States Patent
Kitazato et al.

(10) Patent No.: US 10,681,114 B2
(45) Date of Patent: Jun. 9, 2020

(54) RECEPTION APPARATUS, RECEPTION METHOD, TRANSMISSION APPARATUS, AND TRANSMISSION METHOD FOR TRANSMISSION OR RECEPTION USING A SIGNALING MESSAGE

(71) Applicant: SONY CORPORATION, Tokyo (JP)

(72) Inventors: Naohisa Kitazato, Tokyo (JP); Yoshiharu Dewa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/301,889

(22) PCT Filed: Nov. 11, 2014

(86) PCT No.: PCT/JP2014/079837
§ 371 (c)(1),
(2) Date: Oct. 4, 2016

(87) PCT Pub. No.: WO2015/162813
PCT Pub. Date: Oct. 29, 2015

(65) Prior Publication Data
US 2017/0026458 A1     Jan. 26, 2017

(30) Foreign Application Priority Data

Apr. 22, 2014 (JP) ................. 2014-088630

(51) Int. Cl.
*H04L 29/08* (2006.01)
*H04H 20/28* (2008.01)
(Continued)

(52) U.S. Cl.
CPC ............ *H04L 67/06* (2013.01); *H04H 20/28* (2013.01); *H04H 20/93* (2013.01); *H04H 20/95* (2013.01);
(Continued)

(58) Field of Classification Search
CPC ........ H04H 20/28; H04H 20/93; H04H 20/95; H04N 21/435; H04N 21/235; H04N 21/433; H04L 67/141; H04L 67/06
See application file for complete search history.

(56) References Cited

U.S. PATENT DOCUMENTS 6,886,178 B1 * 4/2005 Mao ................. H04N 7/163
348/E7.061
7,089,579 B1 * 8/2006 Mao ................. H04N 7/17318
348/E7.071
(Continued)

FOREIGN PATENT DOCUMENTS

CN        1319304 A      10/2001
EP        2 712 091 A1    3/2014
(Continued)

OTHER PUBLICATIONS

"Information technology—High efficiency coding and media delivery in heterogeneous environments—Part 1: MPEG media transport (MMT)", ISO/IEC DIS 23008-1, Total 89 Pages, (Apr. 26, 2013).
(Continued)

*Primary Examiner* — Abdulkader M Alriyashi
(74) *Attorney, Agent, or Firm* — Oblon, McClelland, Maier & Neustadt, L.L.P.

(57) ABSTRACT

A reception apparatus and a reception method, by which a file is received in an MMT system. On a transmission side, a resource constituting an application, information mapping a URL, which indicates a location in an application, on a location on an MMT transmission path of broadcasting or the like, and information indicating a unit of display and a link relationship in the application are transmitted. On a receiver side, access ranges to hierarchical file data when a data broadcasting application is executed, and location
(Continued)

information and size of the file data in each access range are acquired, and the application is effectively pre-cached.

7 Claims, 30 Drawing Sheets

(51) Int. Cl.
    *H04H 20/95*     (2008.01)
    *H04H 20/93*     (2008.01)
    *H04N 21/435*     (2011.01)
    *H04N 21/235*     (2011.01)
    *H04N 21/433*     (2011.01)

(52) U.S. Cl.
    CPC ......... *H04L 67/141* (2013.01); *H04N 21/235* (2013.01); *H04N 21/435* (2013.01); *H04N 21/433* (2013.01)

(56) References Cited

U.S. PATENT DOCUMENTS

| | | | |
|---|---|---|---|
| 7,716,713 B1 * | 5/2010 | Ryu | ........................ H04H 60/13 725/132 |
| 2007/0025698 A1 * | 2/2007 | Nakamura | ............. G11B 20/10 386/337 |
| 2011/0219047 A1 * | 9/2011 | Dewa | ................... G11B 27/105 707/812 |
| 2012/0060197 A1 | 3/2012 | Kitahara et al. | |
| 2012/0099022 A1 * | 4/2012 | Sundy | .............. H04N 21/23424 348/705 |
| 2013/0060956 A1 * | 3/2013 | Nagaraj | ............. H04N 21/4384 709/231 |

FOREIGN PATENT DOCUMENTS

| | | |
|---|---|---|
| JP | 2000-31921 A | 1/2000 |
| JP | 2000-36946 A | 2/2000 |
| JP | 2001-186434 A | 7/2001 |
| JP | 2013-153291 A | 8/2013 |
| WO | WO 2013/009132 A2 | 1/2013 |
| WO | WO 2013/077662 A1 | 5/2013 |
| WO | WO 2014/010830 A1 | 1/2014 |

OTHER PUBLICATIONS

Kazuhiro Otsuki, et al., "A Proposal of Control Information over Hybrid Delivery Systems in Broadcast and Broadband Networks", ITE Technical Report, NHK Science & Technology Research Laboratories, vol. 38, No. 14, Total 8 Pages, (Feb. 28, 2014), (with English Translation).
Kazuhiro Otsuki, et al., "A Study of MMT-based Data Transmission Scheme for Super Hi-Vision Satellite Broadcasting Systems", ITE Technical Report, vol. 38, No. 14, Total 12 Pages, (Mar. 2014), (with English Translation).
International Search Report dated Feb. 17, 2015 in PCT/JP14/079837 Filed Nov. 11, 2014.
Extended European Search Report dated Aug. 3, 2017 in Patent Application No. 14890359.4.
"Text of ISO/IEC $2^{nd}$ CD 23008-1 MPEG Media Transport", MPEG-H Systems , International Organization For Standardization, Coding Of Moving Pictures And Audio, ISO/I EC JTC1 /SC29/WG11, MPEG/N13293, XP30020043, Jan. 2013, 152 pages.
Office Action dated Jan. 30, 2018 in Japanese Patent Application No. 2015-042054, along with an English translation.
Extended European Search Report dated May 11, 2018 in European Patent Application No. 14890359.4, 10 pages.
International Organization for Standardization Organisation Internationale de Normalisation ISO/IEC JTC1/SC29/WG11, "Study of ISO/IEC CD 23008-1 MPEG Media Transport", MPEG-H Systems, XP 55472650, Oct. 2012, pp. 1-116 with cover pages.
Combined Chinese Office Action and Search Report dated Jan. 17, 2019 in corresponding Chinese Patent Application No. 201480077978.6 (with English Translation), 14 pages.

* cited by examiner

DU_Header of MFU in which timed media is disposed 900

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                  movie_fragment_sequence_number               |
+-+-+-+-+-+-+-+-+-+-+-+-+-+-+-+-+-+-+-+-+-+-+-+-+-+-+-+-+-+-+-+-+
|                          sample_number                        |
+-+-+-+-+-+-+-+-+-+-+-+-+-+-+-+-+-+-+-+-+-+-+-+-+-+-+-+-+-+-+-+-+
|                             offset                            |
+-+-+-+-+-+-+-+-+-+-+-+-+-+-+-+-+-+-+-+-+-+-+-+-+-+-+-+-+-+-+-+-+
|    priority   |   dep_counter |
+-+-+-+-+-+-+-+-+-+-+-+-+-+-+-+-+-+-+-+-+-+-+-+-+-+-+-+-+-+-+-+-+
```

FIG.9

DU_Header of MFU in which non-timed media is disposed 1000

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|                            item_ID                            |
+-+-+-+-+-+-+-+-+-+-+-+-+-+-+-+-+-+-+-+-+-+-+-+-+-+-+-+-+-+-+-+-+
```

FIG.10

PA message 1300

```
PA_message () {
    message_id                              16      uimsbf
    version                                  8      uimsbf
    length                                  32      uimsbf
    extension {
        number_of_tables        N1           8      uimsbf
        for (i=0; i<N1; i++) {
            table_id                         8      uimsbf
            table_version                    8      uimsbf
            table_length                    16      uimsbf
        }
    }
    message_payload {
        for (i=0; i<N1; i++) {
            table()
        }
    }
}
```

FIG.13

| Listing | Japanese name | Description |
|---|---|---|
| message_id | Message ID | Fixed value for identifying PA message in various types of signaling information |
| version | Version | 8-bit integer value, indicating version of PA message and incremented by +1 when some parameters constituting MPT are updated |
| length | Table length | Byte count of PA message, counted immediately after this field |

FIG.14

MP table (first half)

| Syntax | Value | No. of bits | Mnemonic |
|---|---|---|---|
| MP_table() { | | | |
|   table_id | | 8 | uimsbf |
|   version | | 8 | uimsbf |
|   length | | 16 | uimsbf |
|   reserved | '11 1111' | 6 | bslbf |
|   MP_table_mode | | 2 | bslbf |
|   If (table_id == SUBSET_0_MPT_TABLE_ID) { | | | |
|     MMT_package_id { | N1 | | |
|       MMT_package_id_length | | 8 | uimsbf |
|       for (i=0; i<N1; i++) { | | | |
|         MMT_package_id_byte | | 8 | uimsbf |
|       } | | | |
|     } | | | |
|   } | | | |
|   MP_table_descriptors { | N2 | | |
|     MP_table_descriptors_length | | 16 | uimsbf |
|     for (i=0; i<N2; i++) { | | | |
|       MP_table_descriptors_byte | | 8 | uimsbf |
|     } | | | |
|   } | | | |
| } | | | |

FIG.15

MP table (second half)

| Syntax | Value | No. of bits | Mnemonic |
|---|---|---|---|
| number_of_assets | N3 | 8 | uimsbf |
| for (i=0; i<N3; i++) { | | | |
|   identifier_type | | 8 | uimsbf |
|   asset_id_scheme | | 32 | uimsbf |
|   asset_id_length | | 8 | uimsbf |
|   for(j=0;j<N4;j++){ | | | |
|     asset_id_byte | | 8 | uimsbf |
|   } | | | |
|   asset_type | | 32 | char |
|   reserved | '1111 111' | 7 | bslbf |
|   asset_clock_relation_flag | | 1 | bslbf |
|   asset_location { | | | uimsbf |
|     location_count | N6 | 8 | |
|     for (i=0; i<N6; i++) { | | | |
|       MMT_general_location_info() | | | |
|     } | | | |
|   } | | | |
|   asset_descriptors { | | | |
|     asset_descriptors_length | N5 | 16 | uimsbf |
|     for (j=0; j<N5; j++) { | | | |
|       asset_descriptors_byte | | 8 | uimsbf |
|     } | | | |
|   } | | | |
| } | | | |
| } | | | |

FIG.16

| Listing | Japanese name | Description |
|---|---|---|
| table_id | Table ID | Fixed value for identifying MP table in various types of signaling information |
| version | Version | 8-bit integer value, indicating version of MPT and incremented by +1 when some parameters constituting MPT are updated |
| length | Table length | Byte count of MP table, counted immediately after this field |
| package_id | Package ID | Identification information as entire package including, as constituent elements, all signals and files transmitted by broadcast signal |
| MPT_descriptors | MPT descriptor area | Storage area of descriptors related to the entire package, assumed to dispose one or more descriptors after descriptors for various purposes are prescribed |
| number_of_assets | Number of assets | The number of signals (assets) as elements constituting package, the following asset loop being disposed by exactly the number of assets |
| asset_id | Asset ID | ID for uniquely identifying asset |
| gen_loc_info | General location information | Indicating location of acquisition destination of asset |
| asset_descriptors | Asset descriptor area | Storage area of descriptors related to asset, assumed to dispose one or more descriptors after descriptors for various purposes are prescribed |

FIG.17

M2 section message 1800 

| Syntax | No. of bits | Mnemonic |
|---|---|---|
| M2section_message(){ | | |
|     message_id | 16 | uimsbf |
|     version | 8 | uimsbf |
|     length | 16 | uimsbf |
|     table_id | 8 | uimsbf |
|     section_syntax_indicator | 1 | bslbf |
|     '1' | 1 | bslbf |
|     '11' | 2 | bslbf |
|     section_length | 12 | uimsbf |
|     table_id_extension | 16 | uimsbf |
|     '11' | 2 | bslbf |
|     version_number | 5 | uimsbf |
|     current_next_indicator | 1 | bslbf |
|     section_number | 8 | uimsbf |
|     last_section_number | 8 | uimsbf |
|     for(i=0; i<N; i++){ | | |
|         signaling_data_byte | 8 | bslbf |
|     } | | |
|     CRC_32 | 32 | rpcof |
| } | | |
| | | uimsbf |
| | | uimsbf |

FIG.18

MH AI table (MH AIT) 1900 

| Syntax | No. of bits | Mnemonic |
|---|---|---|
| MH-Applicatin_Information_Table(){ | | |
|     table_id | 8 | uimsbf |
|     section_syntax_indicator | 1 | bslbf |
|     reserved_future_use | 1 | bslbf |
|     reserved | 2 | bslbf |
|     section_length | 12 | uimsbf |
|     application type | 16 | uimsbf |
|     reserved | 2 | bslbf |
|     version_number | 5 | uimsbf |
|     current_next_indicator | 1 | bslbf |
|     section_number | 8 | uimsbf |
|     last_section_number | 8 | uimsbf |
|     reserved_future_use | 4 | bslbf |
|     common_descriptor_length | 8 | uimsbf |
|     for(i=0; i<N; i++){ | | |
|         descriptor () | | rpcof |
|     } | | |
|     reserved_future_use | 4 | uimsbf |
|     application_loop_length | | |
|     for(i=0; i<N; i++){ | | |
|         application_identifier () | | |
|         application_control_code | 8 | uimsbf |
|         reserved_future_use | 4 | bslbf |
|         application_descriptor_loop_length | 12 | uimsbf |
|         for (j=0; j<M; j++) { | | |
|             descriptor () | | |
|         } | | |
|     } | | |
|     CRC32 | 32 | rpcof |
| } | | |

FIG.19

Application information descriptor 2000

| Syntax | No. of bits | Mnemonic |
|---|---|---|
| application_descriptor(){ | | |
|    descriptor_tag | 8 | uimsbf |
|    descriptor_length | 8 | uimsbf |
|    application_profile_length | 8 | uimsbf |
|    for(i=0;i<N;i++){ | | |
|       application_profile | 16 | uimsbf |
|       version_major | 8 | uimsbf |
|       version_minor | 8 | uimsbf |
|       version_micro | 8 | uimsbf |
|    } | | |
|    service_bound_flag | 1 | bslbf |
|    visibility | 2 | bslbf |
|    reserved_future_use | 5 | bslbf |
|    application_priority | 8 | uimsbf |
|    for(i=0;i<N;i++){ | | |
|       transport_protocol_label | 8 | uimsbf |
|    } | | |
| } | | |

FIG.20

| Data | Meaning |
|---|---|
| application_profile | Profile of receiver capable of being executed by this application, which indicates request function by bitmap for each of functions requested to receiver.<br>However, upper 3 bits indicate functional bitmap switching.<br>The bitmap is prescribed for each version. |
| version_major<br>version_minor<br>version_micro | Version prescribed by application profile |
| service_bound_flag | Indicating whether this application is effective or not in current service alone. |
| visibility | Indicating whether application is visible or not. |
| application_priority | Relative priority between applications notified in this service |
| transport_protocol_label | Indicating protocol by which application is transmitted. |

FIG.21

Transmission protocol descriptor 2200

| Syntax | No. of bits | Mnemonic |
|---|---|---|
| transport_protocol_descriptor(){ | | |
|     descriptor_tag | 8 | uimsbf |
|     descriptor_length | 8 | uimsbf |
|     protocol_id | 16 | uimsbf |
|     transport_protocol_label | 8 | uimsbf |
|     for(i=0;i<N;i++){ | | |
|         selector_byte | 8 | uimsbf |
|     } | | |
| } | | |

| Syntax | No. of bits | Mnemonic |
|---|---|---|
| for(i=0;i<N;i++){ | | |
|   URL_base_length | 8 | uimsbf |
|   for(j=0;j<N;j++){ | | |
|     URL_base_byte | 8 | uimsbf |
|   } | | |
|   URL_extension_count | 8 | uimsbf |
|   for(j=0;j<URL_extension_count;j++){ | | |
|     URL_extension_length | 8 | uimsbf |
|     for(k=0;k<URL_extension_length;k++){ | | |
|       URL_extension_byte | 8 | uimsbf |
|     } | | |
|   } | | |
| } | | |

Selector byte 2300

FIG.23

Data transmission message 2400

| Syntax | No. of bits | Mnemonic |
|---|---|---|
| Data_Transmission_message(){ | | |
|     message_id | 16 | uimsbf |
|     version | 8 | uimsbf |
|     length | 32 | uimsbf |
|     num_of_tables | 8 | uimsbf |
|     for (i=0; i<num_of_tables;i++) { | | |
|         table_id | 8 | uimsbf |
|         table_version | 8 | uimsbf |
|         table_length | 16 | |
| | | uimsbf |
|     } | | |
|     for (i=0; i<num_of_tables; i++) { | | |
|         table() | | |
|     } | | |
| } | | |

Data asset management table (DAMT) 2500

| Syntax | No. of bits | Mnemonic |
|---|---|---|
| Data_Asset_Management_Table(){ | | |
|   table_id | 8 | uimsbf |
|   version | 8 | uimsbf |
|   length | 16 | uimsbf |
|   number_of_asset | 8 | Uimsbf |
|   for(k=0;k<number_of_asset;k++){ | | |
|     download_id | 32 | uimsbf |
|     asset_ID_scheme | 32 | uimsbf |
|     asse_ID_length | 8 | Uimsbf |
|     for(i=0;i<asset_ID_length;i++){ | | |
|       asset_ID_byte | 8 | uimsbf |
|     } | | |
|     number_of_items | 8 | uimsbf |
|     for (i=0;i<number_of_items;i++){ | | |
|       item_ID | 32 | uimsbf |
|       item_tag | 16 | uimsbf |
|       item_size | 32 | uimsbf |
|       item_version | 8 | uimsbf |
|       item_checksum | 32 | uimsbf |
|       item_info_length | 8 | uimsbf |
|       for(j=0;j<item_info_length;j++){ | | |
|         item_info () | | |
|       } | | |
|     } | | |
|     descriptor_loop_length | 16 | uimsbf |
|     for(i=0;i<descriptor_loop_length;i++){ | | |
|       descriptor() | | |
|     } | | |
|   } | | |
| } | | |

FIG.25

Data location management table (DLMT) 2600

| Syntax | No. of bit | Mnemonic |
|---|---|---|
| Data_Location_Management_Table(){ | | |
|   table_id | 8 | uimsbf |
|   version | 8 | uimsbf |
|   length | 16 | uimsbf |
|   base_URL_length | 8 | uimsbf |
|   for(i=0;i<base_URL_length;i++){ | | |
|     base_URL_byte | 8 | uimsbf |
|   } | | |
|   number_of_items | 8 | uimsbf |
|   for(i=0;i<number_of_items){ | | |
|     item_tag | 16 | uimsbf |
|     number_of_item_URI_bytes | 8 | uimsbf |
|     for (I=0;I<number_of_item_URI_bytes;I++){ | | |
|       item_URI_byte | 8 | uimsbf |
|     } | | |
|   } | | |
| } | | |

FIG.26

Data content management table (DCMT) 2700

| Syntax | No. of bit | Mnemonic |
|---|---|---|
| Data_Content_Management_Table(){ | | |
|   table_id | 8 | uimsbf |
|   version | 8 | uimsbf |
|   length | 16 | uimsbf |
|   number_of_content | 8 | uimsbf |
|   for(i=0;i<number_of_items;i++){ | | |
|     contentID | 16 | uimsbf |
|     content_version | 8 | uimsbf |
|     content_cache_size | 32 | uimsbf |
|     number_of_PU | 8 | Uimsbf |
|     for(j=0;j<number_of_PU;j++){ | | |
|       PU_tag | 8 | uimsbf |
|       PU_cache_size | 32 | uimsbf |
|       number_of_items | 16 | uimsbf |
|       for(k=0;k<number_of_items;j++){ | | |
|         item_tag | 16 | uimsbf |
|       } | | |
|       number_of_linked_PU | 8 | uimsbf |
|       for(k=0;k<number_of_items;k++){ | | |
|         linked_PU_tag | 8 | uimsbf |
|       } | | |
|     } | | |
|   } | | |
| } | | |

FIG.27

RECEPTION APPARATUS, RECEPTION METHOD, TRANSMISSION APPARATUS, AND TRANSMISSION METHOD FOR TRANSMISSION OR RECEPTION USING A SIGNALING MESSAGE

TECHNICAL FIELD

The technology disclosed in this specification relates to a reception apparatus and a reception method, by which a file is received, and a transmission apparatus and a transmission method, by which a file is transmitted, for example, to a reception apparatus and a reception method, by which a file transmitted in a predetermined transport system is received, and a transmission apparatus and a transmission method.

BACKGROUND ART

In a current broadcasting system, an MPEG-2 TS (Moving Picture Experts Group-2 Transport Stream) system and an RTP (Real Time Protocol) system are widely used as media transport systems (see, for example, Patent Document 1). As the next generation digital broadcasting system, an MMT (MPEG Media Transport) (see, for example, Non-patent Document 1), which is standardized as a new media transport system in the MPEG, has been studied. In the MMT, different transmission paths can be easily used in combination. The MMT can be used in common to multiple transmission paths of broadcasting and communication.

According to the MMT system, it is possible to transmit, in MMT packets, both of Timed media such as video and audio that is stream media and Non timed media such as a file.

Patent Document 1: Japanese Patent Application Laid-open No. 2013-153291

Non-patent Document 1: ISO/IEC FDIS 23008-1: 2013(E) Information technoplogy-High efficiency coding and media delivery in heterogeneous environments-Part1: MPEG media transport (MMT)

SUMMARY OF INVENTION

Problem to be Solved by the Invention

It is an object of the technology disclosed in this specification to provide an optimal reception apparatus and reception method, by which a file transmitted in a predetermined transport system can be suitably received, and an optimal transmission apparatus and transmission method, by which a file can be suitably transmitted in the predetermined transport system.

Means for Solving the Problem

The present application has been made in consideration of the above object. The technology described in a first aspect is a reception apparatus including: a reception section that receives a transmitted signal of a predetermined transport system; a demultiplexer that demultiplexes a received signal into pieces of media data and signaling information; and a control section that controls caching of at least one of the demultiplexed pieces of media data, on the basis of the demultiplexed signaling information.

According to the technology described in a second aspect of the present application, in the reception apparatus according to the first aspect, the predetermined transport system is an MMT.

According to the technology described in a third aspect of the present application, in the reception apparatus according to the first aspect, the transmitted signal includes timed media and non-timed media, and the control section controls caching of the non-timed media.

According to the technology described in a fourth aspect of the present application, in the reception apparatus according to the first aspect, the non-timed media includes pieces of file data, the pieces of file data constituting an asset of a data broadcasting application, and the control section controls caching of the file data in accordance of a free space of a cache.

According to the technology described in a fifth aspect of the present application, the control section of the reception apparatus according to the fourth aspect acquires access ranges to hierarchical file data when the data broadcasting application is executed, and location information and a size of each piece of the file data in each of the access ranges, on the basis of the received signaling information, and controls caching.

According to the technology described in a sixth aspect of the present application, the control section of the reception apparatus according to the fourth or fifth aspect grasps four hierarchical access ranges (a) to (d) and sizes thereof, the access ranges (a) to (d) being (a) file data directly referred to when an application is executed, (b) a resource group of file data constituting an application presentation unit for simultaneous display, (c) a large resource group including the resource group constituting the application presentation unit for simultaneous display and another application presentation unit linked thereto, and (d) a resource group of the whole of the application, and determines in which one of the access ranges caching is performed in accordance with the free space of the cache.

According to the technology described in a seventh aspect of the present application, the control section of the reception apparatus according to the sixth aspect receives first information and second information as the signaling information, the first information mapping a URL on a location on an MMT transmission path of broadcasting or the like, the URL indicating a location in an application, the second information indicating a unit of display and a link relationship in the application, and grasps the four hierarchical access ranges (a) to (d) and the sizes thereof.

According to the technology described in an eighth aspect of the present application, the reception section of the reception apparatus according to the seventh aspect receives an application information table, a data location management table, a data asset management table, and an MMT package table as the first information, the application information table managing an application transmitting method and URL information indicating a location, the data location management table managing a correspondence relationship between the URL indicating the location in the application and item identification information on a data transmission message, the data asset management table managing a correspondence relationship between the item identification information, asset identification information of an asset including an item of the item identification information, a download_id of an MMTP packet on the MMT transmission path of the asset, and the item identification information, the MMT package table managing a correspondence relationship between the asset identification information and packet identification information of a packet transmitting the asset on the MMT transmission path.

According to the technology described in a ninth aspect of the present application, the reception section according to the seventh or eighth aspect receives a data content management table as the second information, the data content management table managing identification information of an application presentation unit included in content, item identification information of all items included in the application presentation unit, and identification information of another application presentation unit linked thereto.

According to the technology described in a tenth aspect of the present application, the control section of the reception apparatus according to any one of first to ninth aspects executes cache processing in response to reception of the signaling information related to an application whose state is controlled to be prefetch (prefetching).

Further, the technology described in an eleventh aspect of the present application is a reception method including: a reception step of receiving a transmitted signal of a predetermined transport system; a demultiplex step of demultiplexing a received signal into pieces of media data and signaling information; and a control step of controlling caching of at least one of the demultiplexed pieces of media data, on the basis of the demultiplexed signaling information.

Further, the technology described in a twelfth aspect of the present application is a transmission apparatus including: a multiplexer that multiplexes timed media, non-timed media, and a signaling message including information available for cache processing of the non-timed media on a reception side; and a transmission section that transmits multiplexed packets in a predetermined transport system.

According to the technology described in a thirteenth aspect of the present application, in the transmission apparatus according to the twelfth aspect, the predetermined transport system is an MMT.

According to the technology described in a fourteenth aspect of the present application, in the transmission apparatus according to the twelfth or thirteenth aspect, the non-timed media includes pieces of file data, the pieces of file data constituting an asset of a data broadcasting application, and the signaling message includes first information and second information, the first information mapping a URL on a location on an MMT transmission path of broadcasting or the like, the URL indicating a location in an application, the second information indicating a unit of display and a link relationship in the application.

According to the technology described in a fifteenth aspect of the present application, in the transmission apparatus according to the fourteenth aspect, the first information includes an application information table, a data location management table, a data asset management table, and an MMT package table, the application information table managing an application transmitting method and URL information indicating a location, the data location management table managing a correspondence relationship between the URL indicating the location in the application and item identification information on a data transmission message, the data asset management table managing a correspondence relationship between the item identification information, asset identification information of an asset including an item of the item identification information, a download_id of an MMTP packet on the MMT transmission path of the asset, and the item identification information, the MMT package table managing a correspondence relationship between the asset identification information and packet identification information of a packet transmitting the asset on the MMT transmission path.

According to the technology described in a sixteenth aspect of the present application, in the transmission apparatus according to the fourteenth or fifteenth aspect, the second information includes a data content management table, the data content management table managing identification information of an application presentation unit included in content, item identification information of all items included in the application presentation unit, and identification information of another application presentation unit linked thereto.

Further, the technology described in a seventeenth aspect of the present application is a transmission method including: a multiplex step of multiplexing timed media, non-timed media, and a signaling message including information available for cache processing of the non-timed media on a reception side; and a transmission step of transmitting multiplexed packets in a predetermined transport system.

Effects of the Invention

According to the technology disclosed in this specification, it is possible to provide an optimal reception apparatus and reception method, by which a file transmitted in a predetermined transport system can be suitably received, and an optimal transmission apparatus and transmission method, by which a file can be suitably transmitted in the predetermined transport system.

It should be noted that the effects described in this specification are merely illustrative and not necessarily limited to those described above. Further, the present invention may produce further additional effects in addition to the effects described above.

Other objects, features, and advantages of the technology disclosed in this specification will become more apparent from more detailed description in conjunction with the following embodiments and the accompanying drawings.

BRIEF DESCRIPTION OF DRAWINGS

FIG. 9 is a diagram showing a configuration example of a DU_Header 900 of an MFU in which timed media is disposed in the payload.

FIG. 10 is a diagram showing a configuration example of a DU_Header 1000 of an MFU in which non-timed media is disposed in the payload.

FIG. 13 is a diagram showing a syntax example of a PA message 1300.

FIG. 14 is a diagram for describing parameters included in the PA message.

FIG. 15 is a diagram showing a syntax example (first half) of an MP table (MPT).

FIG. 16 is a diagram showing a syntax example (second half) of the MP table.

FIG. 17 is a diagram for describing parameters included in the MP table.

FIG. 18 is a diagram showing a configuration example of an M2 section message 1800.

FIG. 19 is a diagram showing a configuration example of an MH AI (Application Information) table (MH AIT) 1900, which is transmitted by the M2 section message.

FIG. 20 is a diagram showing a configuration example of an application information descriptor 2000.

FIG. 21 is a diagram for describing parameters included in the application information descriptor.

FIG. 23 is a diagram showing a configuration example of a selector byte common to HTTP/HTTPS, MMT, and non-timed transmission.

FIG. 25 is a diagram showing a configuration example of a data asset management table (DAMT) 2500.

FIG. 26 is a diagram showing a configuration example of a data location management table (DLMT) 2600.

FIG. 27 is a diagram showing a configuration example of a data content management table (DCMT) 2700.

MODE(S) FOR CARRYING OUT THE INVENTION

Hereinafter, an embodiment of the technology disclosed in this specification will be described in detail with reference to the drawings.

Figure 1:
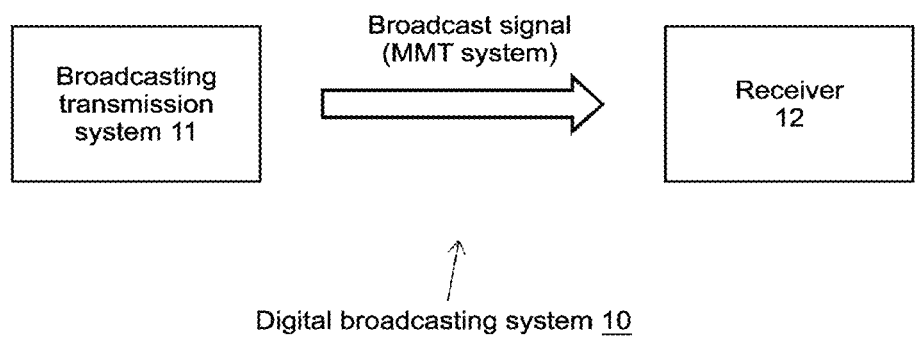
FIG. 1 is a diagram schematically showing a configuration example of a digital broadcasting system 10, to which the technology disclosed in this specification is applied.

FIG. 1 schematically shows a configuration example of a digital broadcasting system 10, to which the technology disclosed in this specification is applied. The digital broadcasting system 10 in the figure includes a broadcasting transmission system 11 and a receiver 12.

The broadcasting transmission system 11 transmits a broadcast signal of an IP (Internet Protocol) system, which includes transmission media. The transmission media of the broadcast signal includes both of timed media and non-timed media such as a file. The timed media is stream data, for example, video, audio, and caption. Further, the non-timed media is file data of an application (content) such as an HTML (Hyper Text Markup Language) document.

Meanwhile, the receiver 12 receives the broadcast signal transmitted from the broadcasting transmission system 11. The receiver 12 then acquires the transmission media such as video, audio, and caption from the received broadcast signal and presents images and audio.

Figure 2:
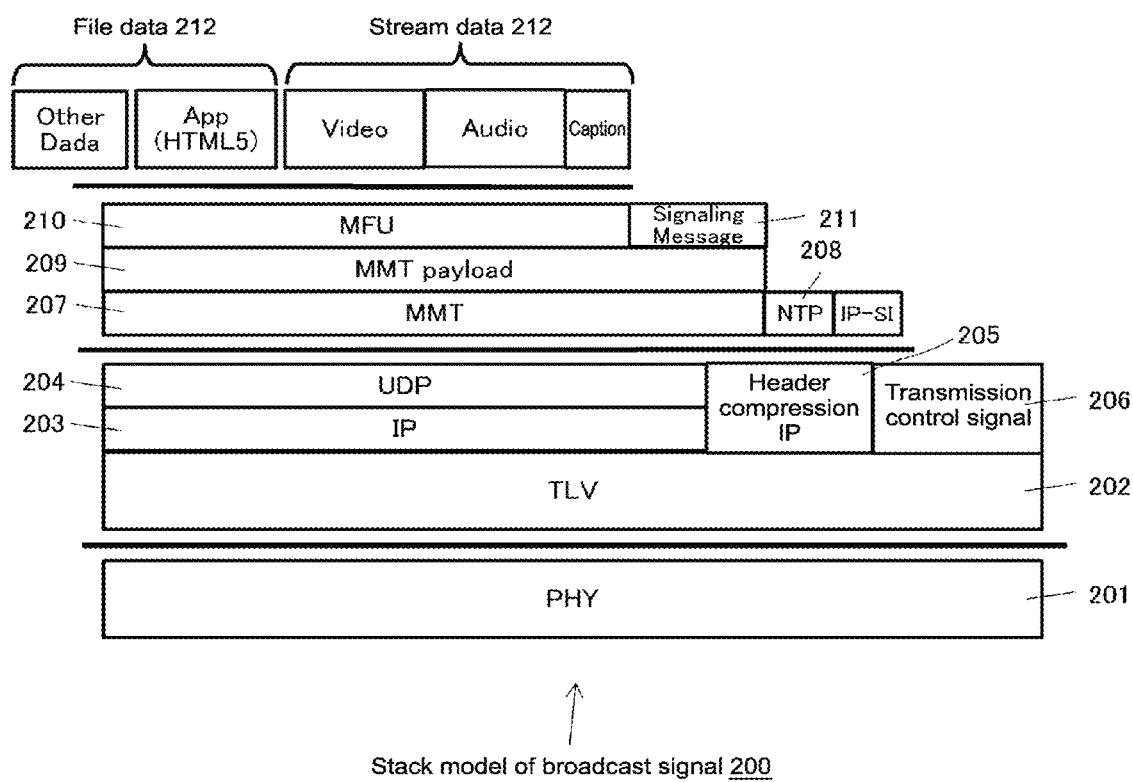
FIG. 2 is a diagram showing a stack model 200 of a broadcast signal, to which an MMT is applied.

In the digital broadcasting system 10 shown in FIG. 1, it is assumed that an MMT is applied as a transport system at the time a broadcast signal is transmitted from the broadcasting transmission system 11 to the receiver 12. FIG. 2 shows a configuration example of the broadcast signal of this case in a stack model 200.

The lowermost layer of the stack model 200 is a physical layer (PHY) 201. The physical example 201 includes a modulation system, an error-correcting system, and the like.

Over the physical layer 201, a TLV (Type Length Value) transmission packet layer 202 is provided. Further, an IP packet 203 is provided over the TLV 202, and a UDP (User Datagram Protocol) 204 is further provided over the IP packet 203. Further, over the TLV transmission packet 202, a header compression IP 205 in which the headers of the IP 203 and the UDP 204 are compressed, and a transmission control signal 206 that is signaling information are also provided.

Over the UDP 204, an MMT packet 207, an NTP (Network Time Protocol) packet 208 including information of the current time, and the like are provided. An MMT protocol (MMTP) is a transport protocol of an application layer for transmitting an MMTP payload 209 on an IP network.

The MMT payload 209 of the MMT packet 207 includes an MFU (MMT Fragment Unit) 210 or a signaling message 211. The MFU 210 is a fragment of an MPU (Media Processing Unit) that is a container of encoded timed media and non-timed media. Stream data (timed media) 212 such as video, audio, and caption, and file data (non-timed media) 213 such as HTML document data are inserted into the MFU 210.

Figure 3:
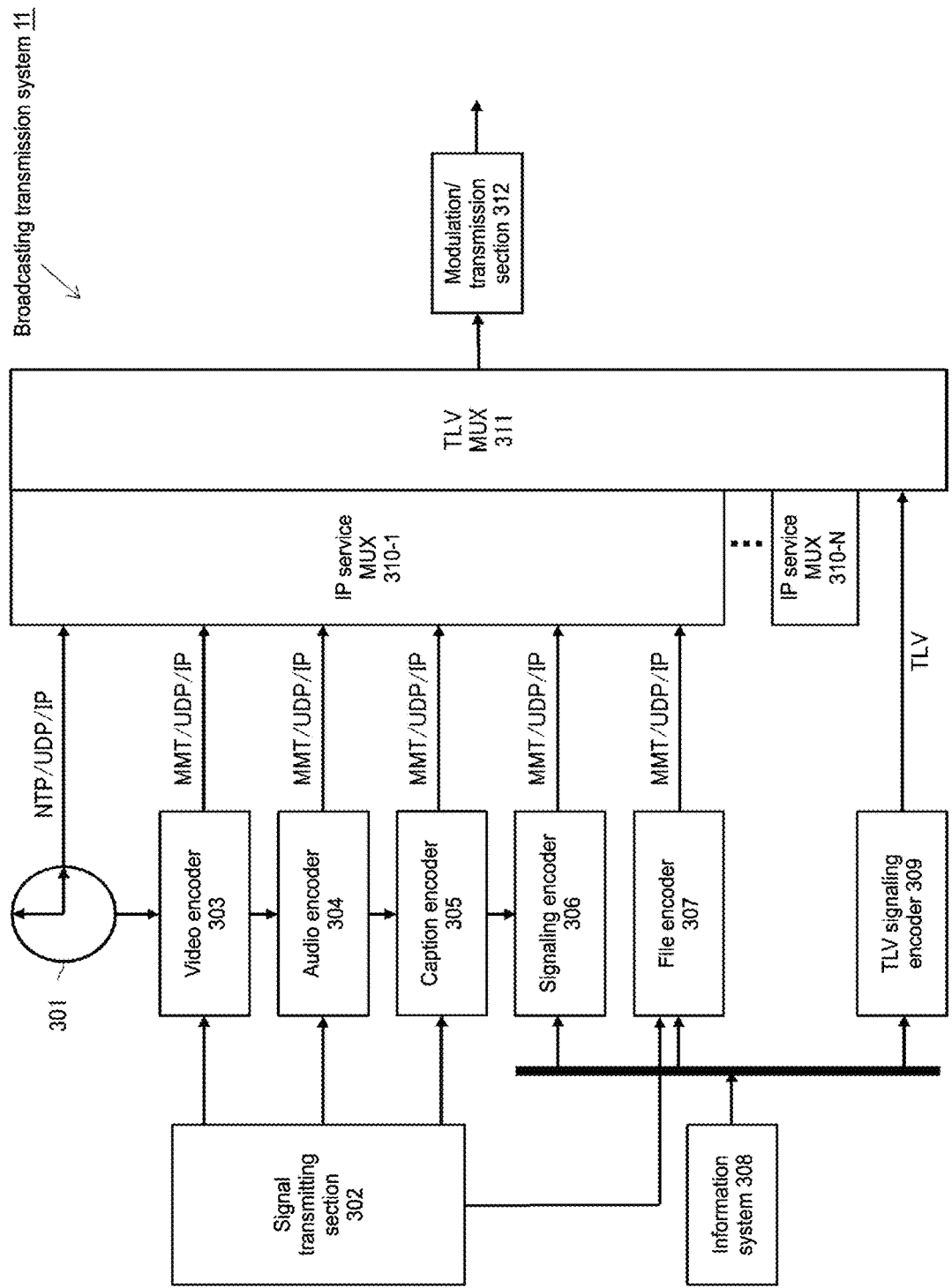
FIG. 3 is a diagram showing a configuration example of a broadcasting transmission system 11 that transmits the broadcast signal shown in FIG. 2.

FIG. 3 shows a configuration example of the broadcasting transmission system 11 that transmits the broadcast signal shown in FIG. 2. The broadcasting transmission system 11 shown in the figure includes a clock section 301, a signal transmitting section 302, a video encoder 303, an audio encoder 304, a caption encoder 305, a signaling encoder 306, a file encoder 307, an information system 308, a TLV signaling encoder 309, IP service multiplexers (MUX) 310, a TLV multiplexer (MUX) 311, and a modulation/transmission section 312.

The clock section 301 generates time information, which is synchronized with time information acquired from an NTP server (not shown), and transmits an IP packet including the time information to the IP service multiplexer 310.

The signal transmitting section 302 is, for example, a studio of a TV broadcast station or a recording and reproducing device such as a VTR. The signal transmitting section 302 transmits stream data that is timed media, such as video, audio, and caption, and file data that is non-timed media, such as HTML document data, to the video encoder 303, the audio encoder 304, the caption encoder 305, and the file encoder 307, respectively. Further, the information system 308 is a scheduler of the TV broadcast station and also a supply source of files, and transmits the HTML document data that is non-timed media and the signaling information to the file encoder 307 and the signaling encoder 306, respectively.

The video encoder 303 encodes a video signal transmitted from the signal transmitting section 302, packetizes the video signal, and transmits an IP packet, which includes an MMT packet of video, to the IP service multiplexer 310. Further, the audio encoder 304 encodes an audio signal transmitted from the signal transmitting section 302, packetizes the audio signal, and transmits an IP packet, which includes an MMT packet of audio, to the IP service multiplexer 310. Further, the caption encoder 305 encodes a caption signal transmitted from the signal transmitting section 302, packetizes the caption signal, and transmits an IP packet, which includes an MMT packet of caption, to the IP service multiplexer 310.

The signaling encoder 306 generates a signaling message on the basis of information transmitted from the information system 308, and transmits an IP packet including an MMT packet, in which the signaling message is disposed in the payload part, to the IP service multiplexer 310. In this embodiment, signaling messages to be generated are roughly classified into tree types: a PA message; an M2 section message; and a data transmission message. The details of each signaling message will be described later.

The file encoder 307 divides the file data, which is transmitted from the signal transmitting section 302 or the information system 308, as necessary, generates an MMT packet including the file data, and transmits an IP packet including the MMT packet to the IP service multiplexer 310. It should be noted that the file data constitutes data broadcasting content (application for data broadcasting).

The broadcasting transmission system 11 is equipped with the IP service multiplexers 310 for the respective transmitted channels (broadcast programs). The IP service multiplexer 310 for one channel multiplexes the IP packets including the video, the audio, the caption, the signaling message, and the file data, which are transmitted from the encoders 303 to 307, respectively, and generates a TLV packet constituting one channel.

The TLV signaling encoder 309 encodes the signaling information transmitted from the information system 308 and generates a TLV packet to be disposed in the payload part.

The TLV multiplexer 311 multiplexes the TLV packets, which are generated in the respective IP service multiplexers 310-1 to 310-N and the TLV signaling encoder 309, and generates a broadcast stream.

The modulation/transmission section 312 RF-modulates the broadcast stream generated in the TLV multiplexer 311 and transmits the broadcast stream to RF transmission paths.

Operations of the broadcasting transmission system 11 shown in FIG. 3 will be described.

In the clock section 301, time information, which is synchronized with time information acquired from an NTP server, is generated, and an IP packet including the time information is generated.

A video signal transmitted from the signal transmitting section 302 is supplied to the video encoder 303. In the video encoder 303, the video signal is encoded and packetized, to generate an IP packet including an MMT packet of video. The IP packet is transmitted to the IP service multiplexer 310.

Further, similar processing is performed also on an audio signal and a caption signal transmitted from the signal transmitting section 302. Further, an IP packet including an MMT packet of audio, which is generated in the audio encoder 304, is transmitted to the IP service multiplexer 310, and an IP packet including an MMT packet of caption, which is generated in the caption encoder 305, is transmitted to the IP service multiplexer 310.

Further, in the signaling encoder 306, a signaling message is generated on the basis of information transmitted from the information system 308, and an IP packet including an MMT packet in which the signaling message is disposed in the payload part is generated. The IP packet is transmitted to the IP service multiplexer 310.

Further, file data transmitted from the signal transmitting section 302 or the information system 308 is supplied to the file encoder 307. In the file encoder 307, the file data is divided as necessary, and an MMT packet including the file data is generated, so that an IP packet including the MMT packet is generated. The IP packet is transmitted to the IP service multiplexer 310.

In the IP service multiplexers 310, the IP packets including the video, the audio, the caption, the signaling message, and the file data, which are transmitted from the encoders 303 to 307, respectively, are multiplexed, and the TLV packets constituting one channel is generated.

In the TLV signaling encoder 309, signaling information transmitted from the information system 308 is encoded, and a TLV packet to be disposed in the payload part is generated.

In the TLV multiplexer 311, the TLV packets generated in the IP service multiplexers 310-1 to 310-N and the TLV signaling encoder 309 are multiplexed, and a broadcast stream is generated. In the modulation/transmission section 312, the broadcast stream generated in the TLV multiplexer 311 is RF-modulated, and the resultant RF modulation signal is transmitted to the RF transmission paths.

Figure 4:
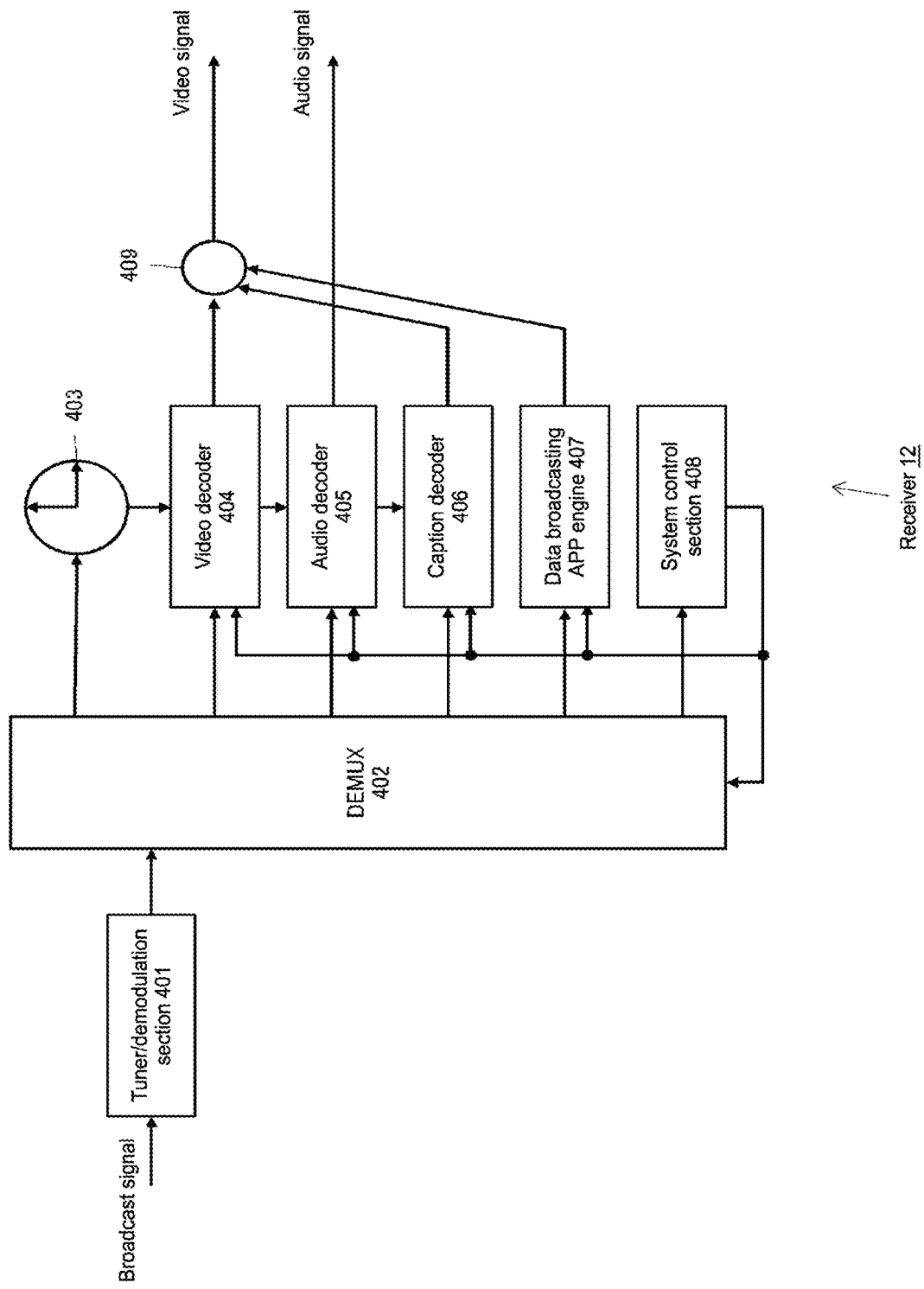
FIG. 4 is a diagram showing a configuration example of a receiver 12 that receives the broadcast signal shown in FIG. 2.

Further, FIG. 4 shows a configuration example of the receiver 12 that receives the broadcast signal shown in FIG. 2. The receiver 12 shown in the figure includes a tuner/demodulation section 401, a demultiplexer (DEMUX) 402, a clock section 403, a video decoder 404, an audio decoder 405, a caption decoder 406, a data broadcasting application engine 407, a system control section 408, and a synthesis section 409.

The tuner/demodulation section 401 receives and demodulates the RF modulation signal, and obtains a broadcast stream. The demultiplexer 402 demultiplexes and packetizes the broadcast stream, and outputs NTP time information, PTS (Presentation Time Stamp: presentation time information), signaling information, encoded signals of video, audio, and caption, file data, and signaling information. It should be noted that the file data constitutes data broadcasting content (application for data broadcasting).

The system control section 408 controls the operations of the respective sections of the receiver 12 on the basis of the signaling information obtained in the demultiplexer 402, operation information from a user via a user operation section (not shown), and the like. The clock section 403 generates, on the basis of the NTP time information obtained in the demultiplexer 402, time information synchronized with that time information.

The video decoder 404 decodes the encoded video signal obtained in the demultiplexer 402 and obtains a baseband video signal. Further, the audio decoder 405 decodes the encoded audio signal obtained in the demultiplexer 402 and obtains a baseband audio signal. Further, the caption decoder 406 decodes the encoded caption signal obtained in the demultiplexer 402 and obtains a display signal of the caption.

The data broadcasting application engine 407 is a processing section for a data broadcasting application, which is transmitted as file data. In other words, the data broadcasting application engine 407 processes the file data obtained in the demultiplexer 402 and obtains a display signal of data broadcasting. The data broadcasting application is file data (HTML document data) described in the HTML format, for example. In this specification, the data broadcasting application is also called "application" or "content".

It should be noted that in the broadcast stream, the file data of identical content is repeatedly transmitted. The system control section 408 controls a filtering operation in the demultiplexer 402 such that only necessary data in the demultiplexer 402, within a file data group repeatedly transmitted, is acquired in the data broadcasting application engine 407.

In this embodiment, the system control section 408 refers to a signaling table included in each of the PA message, the M2 section message, and the data transmission message, specifies an access range necessary to present data broadcasting, and controls a filtering operation for previously acquiring file data capable of being cached in the data broadcasting application engine 407. The details of pre-caching of file data will be described later.

Further, the system control section 408 controls decoding timings in the respective decoders 404 to 406 on the basis of the PTS and adjusts presentation timings of the video, audio, and caption. The synthesis section 409 synthesizes the display signal of the caption and the display signal of the data broadcasting together with the baseband video signal, and obtains a video signal for video display. Further, the baseband audio signal obtained in the audio decoder 405 is to be an audio signal for audio output.

Operations of the receiver 12 shown in FIG. 4 will be described.

In the tuner/demodulation section 401, the RF modulation signal is received and demodulated, and a broadcast stream is obtained. In the demultiplexer 402, the broadcast stream is demultiplexed and depacketized, and NTP time information, PTS, signaling information, encoded signals of video, audio, and caption, and file data are extracted.

The NTP time information extracted in the demultiplexer 402 is transmitted to the clock section 403. In the clock section 403, on the basis of the NTP time information, time information synchronized with that time information is generated. In other words, in the clock section 403, time information that is matched with the time information generated in the clock section 301 of the broadcasting transmission system 11 is generated.

The encoded video signal extracted in the demultiplexer 402 is transmitted to the video decoder 404 for decoding, so that a baseband video signal is obtained. Further, the encoded caption signal extracted in the demultiplexer 402 is transmitted to the caption decoder 406 for decoding, so that a display signal of caption is obtained. Further, the file data extracted in the demultiplexer 402 is transmitted to the data broadcasting application engine 407 for processing, so that a display signal of data broadcasting is obtained. It should be noted that the filtering operation in the demultiplexer 402 is controlled by the system control section 408 such that only necessary file data is acquired in the demultiplexer 402.

In the synthesis section 409, the display signal of the caption and the display signal of the data broadcasting are synthesized together with the baseband video signal, so that a video signal for video display is obtained.

Further, the encoded audio signal extracted in the demultiplexer 402 is transmitted to the audio decoder 405 for decoding, so that a baseband audio signal for audio output is obtained.

Figure 5:
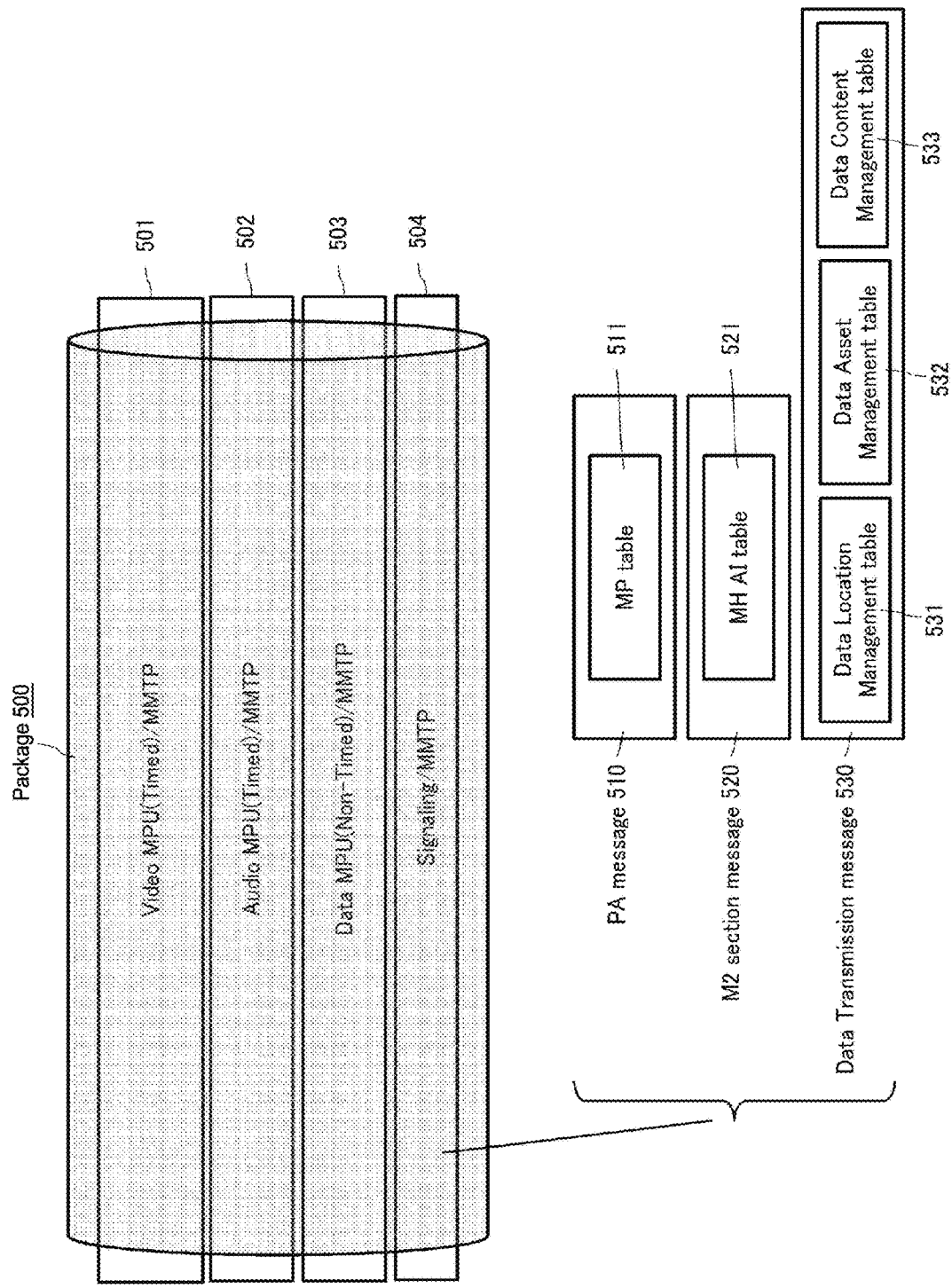
FIG. 5 is a diagram showing an image of a broadcast signal (package) 500 transmitted from the broadcasting transmission system 11 to RF transmission paths according to an MMT system.

In the digital broadcasting system 10 shown in FIG. 1, it is assumed that the MMT is applied as a transport system at the time a broadcast signal is transmitted from the broadcasting transmission system 11 to the receiver 12. FIG. 5 shows an image of a broadcast signal 500 that is transmitted from the broadcasting transmission system 11 to the RF transmission paths according to the MMT system.

A broadcast signal of one channel (broadcast program) is constituted by timed media such as video, audio, and caption and non-timed media such as file data, and encoded media data of those media are stored in the MPUs and then transmitted. Further, information on transmission control of the broadcast signal and the like are transmitted as signaling information. In the MMT, the data of the timed media and non-timed media constituting one channel (broadcast program) can be easily used in combination of different transmission paths. In the example shown in FIG. 5, for the broadcast signal 500, MMT transmission paths 501 to 504 for data types such as video, audio, caption, file data, and signaling information are used. It should be noted that illustration of a transmission path for caption data is omitted for convenience sake.

One channel (broadcast program) can be called "package", which is constituted by different types of assets such as video, audio, caption, and file data (application) (the package is a logical set of media data transmitted through the MMT transmission paths). Each of the assets is a set (logical group) of 1 or more MPUs sharing the same asset_id, and transmitted through each dedicated ES (Elementary Stream), that is, on the MMT transmission path (the asset is the entity of data associated with a unique identifier and used for constituting multimedia presentation). In other words, in the transmission path 501, MMT packets (MMTP) of video constituted by an MPU logical group having a common asset_id are transmitted. In the transmission path 502, MMT packets of audio constituted by an MPU logical group having a common asset_id are transmitted. In the transmission path 503, MMT packets of file data constituted by an MPU logical group having a common asset_id are transmitted. The MPU is identified by the asset_id and a sequence number of the MPU on an appropriate transmission path. Further, the MMT transmission path for transmitting each of the media can be identified by the asset_id.

In addition, in one package (broadcast program), assets having the same type (that is, having different asset_id) may be transmitted. For example, two or more pieces of file content (data broadcasting applications) are provided to the same broadcast program. In such a case, the different pieces of file content are provided with different asset_id and transmitted as different MPU logical groups on different MMT transmission paths. In FIG. 5, only one transmission path 503 for file data is illustrated for simplification.

Further, the MMT can be used in common to a plurality of transmission paths for broadcasting and communication. The non-timed media such as HTML document data can be transmitted through the transmission path for broadcasting together with the timed media as shown in FIG. 5, and also provided through a transmission path for communication.

Further, in the transmission path 504, MMT packets including the same signaling message are repeatedly transmitted. For achievement of the technology disclosed in this specification, the signaling message to be transmitted includes three types of signaling messages, a PA message 510, an M2 section message 520, and a data transmission message 530. Signaling tables are transmitted by the various signaling messages. For example, the PA message 510 includes an MP (MMT Package) table 511. Further, the M2 section message 520 includes an MH AI (Application Information) table 521. Further, the data transmission message 530 is a message for notifying a data transmission method and a data management control method, and includes signaling tables of a data location management table 531, a data asset management table 532, and a data content management table 533. The details of each table will be described later.

Figure 6:
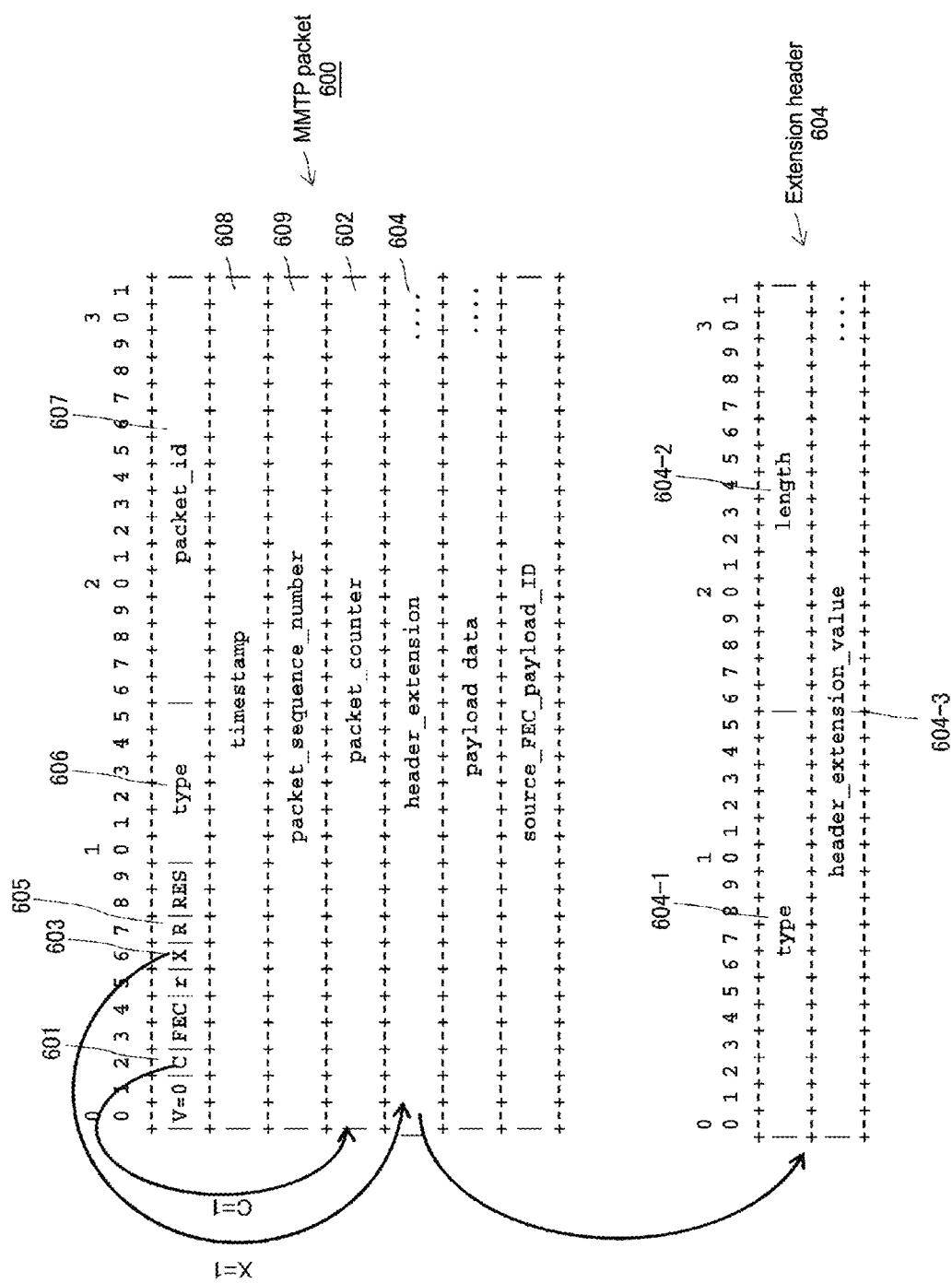
FIG. 6 is a diagram showing a configuration example of a header of an MMT packet.

As described above, in the MMTP, the timed media such as video, audio, and caption and the non-timed media such as file data are transmitted. FIG. 6 shows a configuration example of an MMTP packet 600. The MMTP packet is a unit of media data that is formatted to be transmitted using an MMT protocol. See, for example, Non-patent Document 1 for the details thereof.

When 1 is assigned to a packet counter flag "C" denoted by reference number 601, this represents that a field of a packet counter denoted by reference number 602 is present within the MMTP packet. The packet counter 602 is a 32-bit length field in which an integer value of the count of the MMTP packet is written, and is incremented by 1 every time the MMTP packet is transmitted.

When 1 is assigned to an extension flag "X" denoted by reference number 603, this represents that an extension header 604 denoted by reference number 604 is present. The lower part of FIG. 6 also shows a configuration example of the extension header 604. The extension header 604 is constituted by a type field of a 16-bit length, which is denoted by reference number 604-1, a length field denoted by reference number 604-2, and a header_extensin_value field denoted by reference number 604-3. In the length field, a byte length of the header_extensin_value field is written. In the header_extensin_value field, extension information falling outside the specifications of the MMT can be written.

In a type field denoted by reference number 606, a type value representing a type of payload data of the MMTP packet is written. The definition of the type value is as shown in Table 1 below.

TABLE 1

| Value | Data type | Definition of data unit |
|---|---|---|
| 0x00 | MPU | a media-aware fragment of the MPU |
| 0x01 | Generic object | A generic object such as a complete MPU or an object of another type |
| 0x02 | Signaling message | one or more signaling messages or a fragment of a signaling message |
| 0x03 | Repair symbol | a single complete repair symbol |

When 1 is assigned to a RAP (Random Access Point) flag denoted by reference number 605, this represents that the payload of the MMTP packet includes a Random Access Point to a data stream of the data type.

In a packet_id field of a 16-bit length, which is denoted by reference number 607, an integer value for distinguishing an asset is written. The value of this field derives from an asset_id of an asset to which the MMTP packet belongs. Mapping of the packet_id and the asset_id is shown by an MMT package (MP) table as a part of the signaling message.

In a timestamp field of a 32-bit length, which is denoted by reference number 608, a transmission time of the MMTP packet is described in a short-format stipulated by an NTP protocol.

In a packet_sequence_number field of a 32-bit length, which is denoted by reference number 609, an integer value (a sequence number on the MMT transmission path) for identifying packets having an identical packet_id is described.

Figure 7:
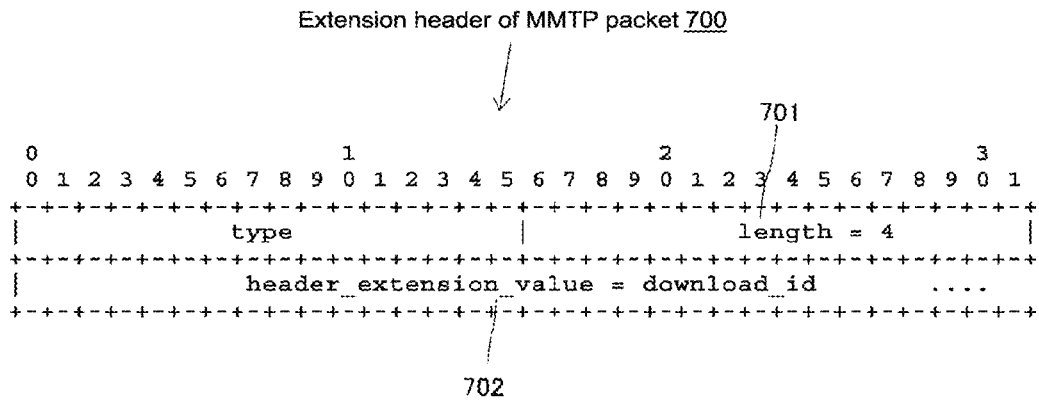
FIG. 7 is a diagram showing a configuration example of an extension header 700 of an MMTP packet that transmits non-timed media.

FIG. 7 shows a configuration example of an extension header 700 of an MMTP packet that transmits non-timed media. As shown in the figure, in this case, 4 is written in a length field 701 as a byte length of a header_extensin_value field. In the header_extensin_value field, a download_id is described in 4 bytes.

When an MPU is transmitted using the MMT protocol, it is necessary to perform packetization and depacketization on the transmission side and the reception side, respectively. By the packetization, the MPU is inserted into the MMTP payload and transmitted in the MMTP packet. The format of the MMTP payload allows fragmentation of the MMTP payload so as to enable a large payload to be transmitted. Further, the format of the MTP payload also allows aggregation in which a plurality of MMTP payloads is inserted into a single MMTP payload so as to correspond to a small data unit. The reception side performs depacketization to restore the original MPU data.

Figure 8:
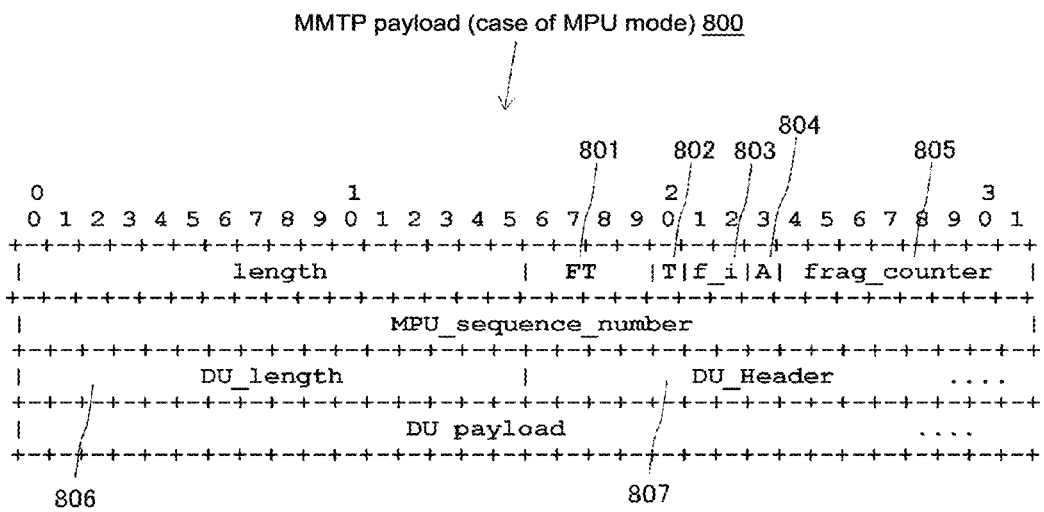
FIG. 8 is a diagram showing a configuration example of an MMTP payload 800 in an MPU mode.

FIG. 8 shows a configuration example of an MMTP payload 800 in an MPU mode. See, for example, Non-patent Document 1 for the details thereof. The MPU mode applies to a case where "0x00" is written in the type field 606 of the MMTP header. The MMTP packet in the MPU mode is used for transmitting video, audio, and file data (application).

In an MPU Fragment Type (FT) field denoted by reference number 801, a type of a fragment is indicated by a 4-bit value. The definition of an FT value is as shown in Table 2 below.

TABLE 2

| FT | Description | Content |
|---|---|---|
| 0 | MPU metadata | contains the ftyp, mmpu, moov, and meta boxes as well as any other boxes that appear in between. |
| 1 | Movie fragment metadata | contains the moof box and the mdat box, excluding all media data inside the mdat box. |
| 2 | MFU | contains a sample or sub-sample of timed media data or an item of non-timed media data. |

When 1 is described in a Timed (T) flag denoted by reference number 802, this represents that the MPU transmitting timed media is fragmented. When 0 is described therein, this represents that the MPU transmitting non-timed media is fragmented.

A fragmentation identifier (f_i) field, which is denoted by reference number 803, represents information on fragmentation of a data unit within the payload in 2 bits. The definition of four values of f_i is as shown in Table 3 below.

TABLE 3

| Value | Definition of data unit |
|---|---|
| 00 | Payload includes an integer number of data units. |
| 01 | Payload includes a data unit of the first fragment. |
| 10 | Payload includes a data unit of a middle fragment. |
| 11 | Payload includes a data unit of the last fragment. |

When the payload is aggregation of a plurality of data units, 1 is described in an aggregation (A) flag denoted by reference number 804.

In a fragment_counter field of a 8-bit length, which is denoted by reference number 805, the number of payloads including a fragment of the same data unit followed by the MMTP payload is described.

In a DU_length field of a 16-bit length, which is denoted by reference number 806, a length of data (DU: Data Unit) followed by the field is described. However, when the A flag 804 is 0, the DU_length field 806 does not exist.

A DU_Header denoted by reference number 807 is a header of the data unit. However, when the FT value 801 is 0 or 1 (in other words, when the FT value 801 is not the MFU), the DU_Header 807 does not exist. The MFU includes a sample or sub-sample of timed media or an item of non-timed media.

FIG. 9 shows a configuration example of a DU_Header 900 of an MFU in which timed media is disposed in the payload. Further, FIG. 10 shows a configuration example of a DU_Header 1000 of an MFU in which non-timed media is disposed in the payload. As shown in FIG. 10, in the case of the non-timed media, the DU_Header 1000 is constituted by an item_ID of a 32-bit length, which is an identifier of an item transmitted as a part of the MFU. The item is a resource that constitutes an application such as HTML document data or mono media data referred to from an HTML document. On the MMT transmission path specified by the asset_id, the item can be uniquely identified by combination of the packet_id in the header of the MMTP packet and the download_id in the extension header thereof described above, and the item_ID in the DU header.

Figure 11:
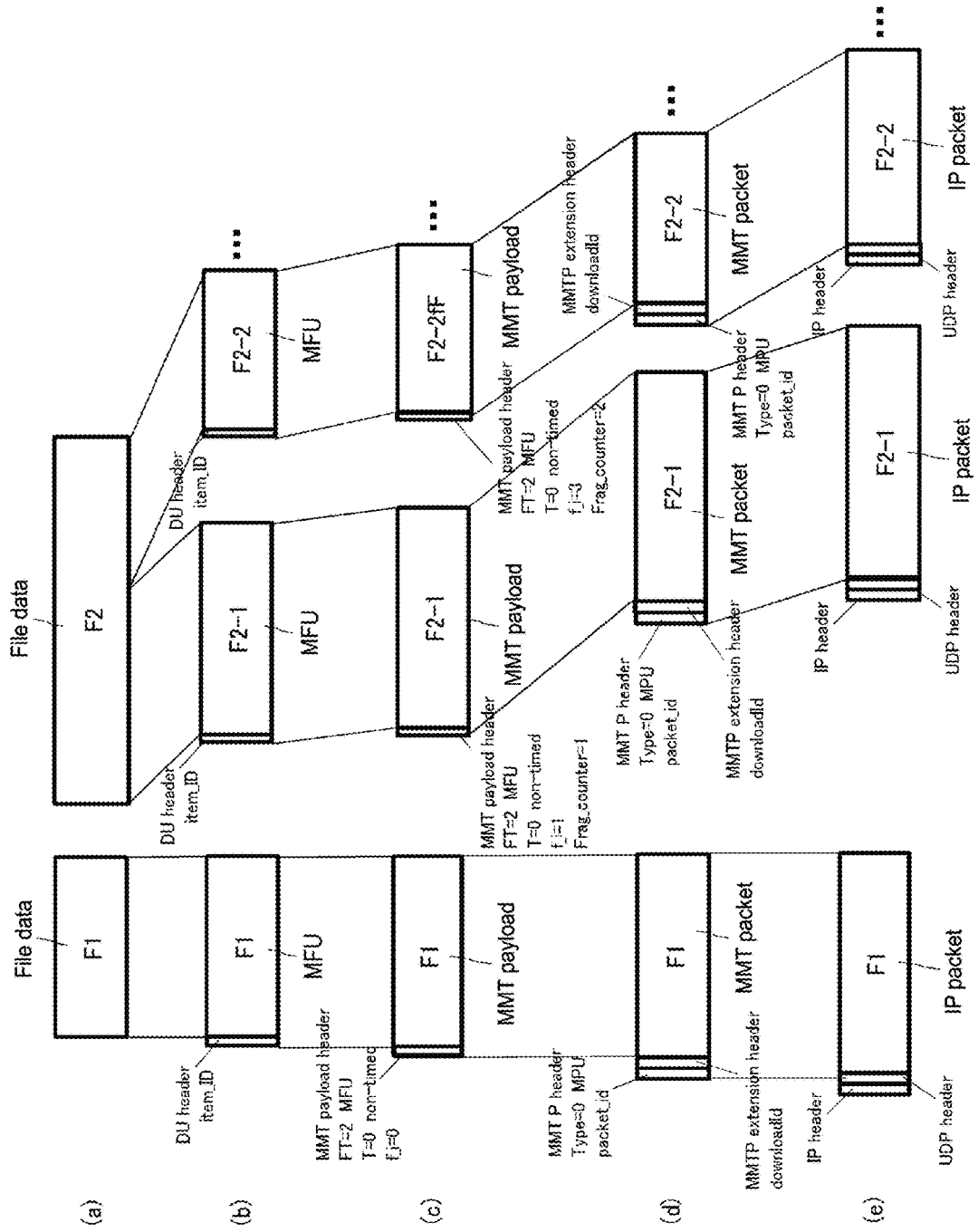
FIG. 11 is a diagram showing a packet configuration example at the time data of the non-timed media is transmitted.

FIG. 11 shows a packet configuration example at the time the data of the non-timed media is transmitted.

FIG. 11(*a*) shows a state of the original file data. In the figure, each of F1 and F2 is one piece of file data. The file data is, for example, an HTML document and includes one or more items. Further, the HTML document itself is one item.

FIG. 11(*b*) shows a state where the file data F1 and the file data F2 are disposed in the MFUs. Since the file size of the file data F1 is not large, the file data F1 is disposed in the payload of one MFU as it is. Meanwhile, since the file size of the file data F2 is large, the file data F2 is divided into pieces of data, and each piece of data is disposed in the payload of an MFU. In the example shown in the figure, the file data F2 is divided into F2-1 and F2-2, and the F2-1 and the F2-2 are disposed in the payloads of different MFUs.

Here, attached to an MFU in which the non-timed media such as HTML document data or mono media is disposed in the payload is the DU_Header (see FIG. 10) in which an item_ID uniquely indicating an item of the MUF is described.

Subsequently, as shown in FIG. 11(*c*), a header of the MMT payload (see FIG. 8) is attached to each MFU, so that an MMT payload is obtained. Here, a value 2 is described in the Fragment Type (FT) field of the header of the MMT payload, to represent that the type of the fragment is an MFU. Further, a value 0 is described in the Timed (T) flag, to represent that the MPU transmits non-timed media. Further, in an MFU in which non-timed media not fragmented is disposed, a value 0 is described in the Fragmentation Identifier (f_i) field. Meanwhile, in an MFU in which fragmented non-timed media is disposed, a value 1 is described in the Fragmentation Identifier (f_i) field, and a count value corresponding to the fragment_counter field is described.

Next, as shown in FIG. 11(*d*), the header of the MMTP packet and the extension header thereof (see FIG. 6) are attached to each MMT payload, so that an MMT packet stream is obtained. Here, 0 is described in the type field of the MMTP header to describe that the type of the payload data is an MPU. In the packet_id field, an integer value for distinguishing an asset is written. Further, the download_id is described in the extension header. Therefore, on the MMT transmission path specified by the asset_id, the item can be uniquely identified by combination of the packet_id in the header of the MMTP packet and the download_id in the extension header thereof described above, and the item_ID in the DU header.

Further, as shown in FIG. 11(*e*), an IP header and a UDP header are attached to each MMT packet, so that an IP packet stream is obtained. Though not shown in the figure, when a TLV header is attached to each IP packet, a TLV packet constituting a broadcast stream is generated.

Though not shown in FIG. 11, in the MMT packets, some MMT packets include a signaling message in the payload. The signaling message is a PA message, an M2 section message, or a data transmission message (see the above description and FIG. 5). Whether the MMTP payload includes transmission media such as timed media or non-timed media or includes a signaling message can be determined by referring to the value of the type field in the MMTP header.

Subsequently, the configuration of the signaling message used in the MMT protocol, which is involved in the achievement of the technology disclosed in this specification, will be described. The signaling message is signaling information that is necessary for package transmission control or for use of packages, and transmits various signaling tables.

The signaling message of the MMT uses a general format constituted by three common fields, one specific field for each signaling message type, and a message payload. The message payload transmits signaling information. Hereinafter, the PA message, the M2 section message, and the data transmission message will be described in the stated order.

Figure 12:
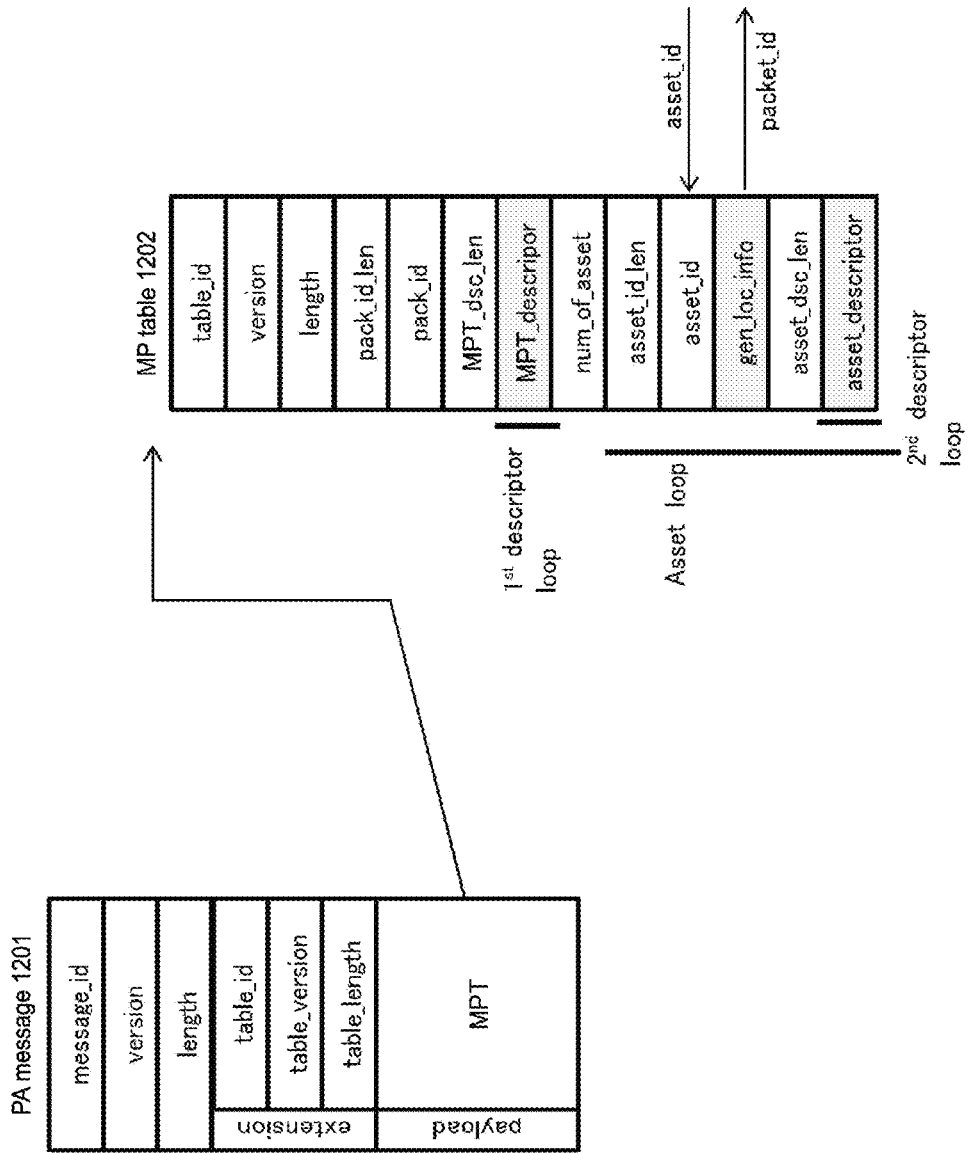
FIG. 12 is a diagram showing configuration examples of a PA message 1201 and an MP table 1202 included in the PA message.

The PA (Package Access) message transmits a PA table including information on all signaling tables necessary for Package Access. The PA table includes an MMT Package (MP) table. FIG. 12 shows configuration examples of a PA message 1201 as one signaling message, and an MP table 1202 included in the PA message. Further, FIG. 13 shows a syntax example of a PA message 1300, and FIG. 14 shows descriptions of parameters included in the PA message.

A message_id is a 16-bit fixed value for identifying a PA message in various types of signaling information. A version is a parameter as an 8-bit integer value, which indicates a version of the PA message. For example, when some parameters constituting an MP table are updated, the version is incremented by +1. A length is a parameter of a 32-bit length, which indicates the size of the PA message in terms of bytes, the size being counted immediately after this field.

In an extension field, index information of the MP table (MPT) disposed in the payload field is disposed. In this field, a table_id of 8 bits, a table_version of 8 bits, and a table_length of 16 bits are disposed. The table_id is a fixed value for identifying the MP table. The table_version indicates a version of the MP table. The table_length indicates the size of the MP table in terms of bytes.

In the payload field of the PA message, the MP table is disposed. The MP table stores information related to a package including a list of all assets.

FIG. 15 and FIG. 16 each show a syntax example of the MP table (FIG. 16 is the second half subsequent to FIG. 15). Further, FIG. 17 shows descriptions of parameters included in the MP table. Hereinafter, a configuration of the MP table will be described.

A table_id is an 8-bit fixed value for identifying the MP table in various types of signaling information. A version is an 8-bit integer value, which indicates a version of the MP table. For example, when some parameters constituting the MP table are updated, the version is incremented by +1. A length is a parameter of a 32-bit length, which indicates the size of the MP table in terms of bytes, the size being counted immediately after this field.

An MMT_package_id is identification information as the entire package, which includes as constituent elements assets such as all signals (video, audio, and caption) and files transmitted by the broadcast signal. The identification information is text information. An MMT_package_id_length indicates the size of the text information in terms of bytes.

A field of MP_table_descriptors is a storage area of descriptors related to the entire package. An MPT_table_descriptor_length is a parameter of a 16-bit length, which indicates the size N2 of the field in terms of bytes. It is assumed that in the MP_table_descriptor, the descriptors corresponding to N2 (one or more) descriptors are disposed after descriptors for various purposes are prescribed.

A number_of_assets is an 8-bit parameter, which indicates the number of assets (signals, files) as constituent elements of the package. The following Asset loop is disposed by exactly the number (N3) of number_of_asset.

In one Asset loop, parameters of asset identification information (asset_id) as information of an individual asset, general location information (gen_loc_info), and an asset descriptor (asset descriptor) are disposed.

An identifier_type indicates an ID system of an MMTP packet flow. When the ID system indicates an asset_id, 0x00 is set. An asset_id_scheme indicates the format of the asset_id. An asset_id_length indicates the length of the asset_id. In a subsequent loop of an asset_id_byte, asset identification information (asset_id) is indicated in terms of bytes. Further, an asset type indicates a character string representing the type of asset. An asset_clock_relation_flag is a flag indicating the presence or absence of a clock information field of the asset. When the flag is 1, a clock information identification field (asset_clock_relation_id) and a timescale flag field (asset_timescale_flag) are present. When the flag is 0, those fields are absent. Further, in the field of an asset_location, the number of location information of the asset is specified by a location count. In a subsequent loop of the location information, the location information of the asset (MMT_general_location_info) is indicated by exactly the specified number of pieces of location information. In this embodiment, the location information of the asset is described in the format of the packet id on the transmission path that is to be an acquisition destination of the asset. Therefore, the asset_id is drawn on the MP table, so that an appropriate packet ID on the MMT transmission path can be extracted.

A field of an asset_descriptor is a storage area of a descriptor related to the asset. An asset_descriptor_length indicates the size N5 of the field of the asset_descriptor in terms of bytes. It is assumed that in the asset_descriptor, N5 (one or more) asset descriptors are disposed after asset descriptors for various purposes are prescribed.

The M2 section message is a signaling message, which is used to transmit a section extended format of the MPEG-2 System as it is. FIG. 18 shows a configuration example of an M2 section message 1800. Hereinafter, the meanings of respective parameters of the M2 section message will be described.

A message_id (message identification) is a 16-bit fixed value for identifying an M2 section message in various types of signaling information. In this embodiment, 0x8000 is set. A version (version) is a parameter of an 8-bit integer value, which indicates a version of the M2 section message. A length (message length) is a parameter of a 16-bit length, which indicates the size of the M2 section message in terms of bytes, the size being counted immediately after this field. A table_id (table identification) is an area used for identifying a table to which this section belongs. A section_syntax_indicator (section syntax indicator) is '1' indicating an extended format. A section_length (section length) is an area in which a byte count of data subsequent to the section length area is written. A table_id_extension (table identification extension) is an area in which table identification is extended. A version number (version number) is an area in which a version number of the table is written. A current_next_indicator (current next indicator) is set to '1' when the table is currently available, or set to '0' when the table is not currently available and become effective next. A section_number (section number) is an area in which a section number constituting the table is written. A last_section_number (last section number) is an area in which the last section number constituting the table is written. This is a cyclic redundancy code according to CRC32 (CRC) and ITU-T Recommendation H.222.0.

FIG. 19 shows a configuration example of an MH AI (Application Information) table (MH AIT) 1900, which is transmitted by the M2 section message. Hereinafter, the meanings of respective parameters of the MH AI table will be described.

A table_id (table identification) is an 8-bit fixed value for identifying an application information (AI) table in various types of signaling information. In this embodiment, 0x89 is set. A section_syntax_indicator (section syntax indicator) is a 1-bit field and is constantly "1". A section_length (section length) is a 12-bit field and the leading 2 bits thereof are constantly "00". This prescribes a byte count of the sections from the section length field to the last section including the CRC32. This value does not exceed 1021 (0x3FD in hexadecimal). An application_type (application format) is a 16-bit field and indicates a value of an application transmitted by the AIT. In DVB, 0x0001 is assigned to a DVB-J application. Also in an ARIB-J application, 0x0001 is set. A version_number (version number) is a 5-bit field and is a version number of a sub-table. The version_number is a version number of the MH AI table, and is incremented by +1 when information within the sub-table is changed. Further, when the value of the version number is "31", the value returns to "0" next. A current_next_indicator (current next indicator) is constantly "1". A section_number (section number) is an 8-bit field and indicates a section number. The section number of the first section within the sub-table is 0x00. The section number is incremented by +1 every time a section with an identical table identification and application format is added. A last_section_number (last section number) is an 8-bit field and prescribes the last section number in the sub-table to which the section belongs.

A common_descriptor_length (common descriptor loop length) is an 8-bit field and prescribes the byte length of a subsequent descriptor (descriptor within a description area). This descriptor (descriptor within a description area) stores information of the descriptor (descriptor) in a series of areas including as many loops as the number of common_descriptor_length. The descriptor within a common descriptor area is applied to all applications in the AIT sub-table. For example, a transmission protocol descriptor that specifies a transmission method or an acquisition location of an application is written in the descriptor field.

An application_loop_length is an area in which the number of application information included in the MH AI table is written. A loop of the application information is disposed by exactly the number indicated by the application_loop_length.

In the loop of one piece of application information, a descriptor (application information descriptor) is described, the descriptor being described in a series of areas including as many loops as the number of application_identifier (application identifier), application_control_code (application control code), and application_descriptor_loop_length (application information descriptor loop length). The descriptor within the descriptor area is applied to only a specified application.

The application_identifier (application identifier) is a parameter that identifies an application. The application_control_code (application control code) is an 8-bit field and prescribes a control code that controls the state of the application. Semantics of this field depend on a value of the application format. When "autostart" is instructed as the application_control_code, the receiver that has referred to this MH AT table activates and starts the application specified by the application_identifier. Further, when "prefetch" is instructed as the application_control_code, the receiver that has referred to this MH AT table prefetches the application specified by the application_identifier. Further, when "kill" is instructed as the application_control_code, the receiver that has referred to this MH AT table stopes execution of the application specified by the application_identifier. This is a cyclic redundancy code according to CRC32 (CRC) and ITU-T Recommendation H.222.0.

In short, the MH AI table is a table that specifies a processing method for an application (file data) transmitted through the MMT transmission path or a transmission method (transport_protocol), and a location (URL). When receiving the MH AI table transmitted by the M2 section message, the receiver acquires an application from the specified location by the specified transport_protocol, in order to execute processing specified by the application_control_code.

FIG. 20 shows a configuration example of an application information descriptor 2000 that is stored in the loop of the application information of the MH AI table. Further, FIG. 21 shows descriptions of parameters included in the application information descriptor 2000. Hereinafter, the meanings of respective parameters of the application information descriptor 2000 will be described.

A descriptor_tag is an 8-bit integer value that identifies the descriptor 2000. A descriptor_length is an area in which a byte count of data of the descriptor 2000 subsequent to this field is written.

In a series of areas including as many loops as the number of application_profile_length, information of the application_profile is written. The application_profile is a profile of the receiver, which can be executed by this application. The application_profile indicates a request function by a bitmap for each of functions requested to the receiver. However, the upper 3 bits thereof indicate functional bitmap switching. The bitmap is prescribed for each version. Further, a version_major, a version_minor, and a version_micro are each a version prescribed by an application profile.

A service_bound_flag is a flag indicating whether this application is effective or not in the current service alone. A visibility indicates whether the application is visible or not. An application_priority is a relative priority between applications notified in this service. A transport_protocol_label indicates a protocol by which an application is transmitted.

As a value of the transport_protocol_label, 0x0003 prescribes HTTP/HTTPS transmission, and 0x0005 prescribes MMT and non-timed transmission.

Figure 22:
FIG. 22 is a diagram showing a configuration example of a transmission protocol descriptor 2200.

Further, FIG. 22 shows a configuration example of a transmission protocol descriptor 2200, which is stored in the application information of the MH AI table as a common descriptor. Hereinafter, the meanings of respective parameters of the transmission protocol descriptor 2200 will be described.

A descriptor_tag is an 8-bit integer value that identifies the descriptor 2200. A descriptor_length is an 8-bit area in which a byte count of data of the descriptor 2200 subsequent to this filed is written.

A protocol_id (protocol ID) indicates a protocol by which an application is transmitted. As a value thereof, 0x0003 prescribes HTTP/HTTPS transmission, and 0x0005 prescribes MMT and non-timed transmission. A transport_protocol_label (transport protocol label) is a value that uniquely identifies transmission means when one application is transmitted through a plurality of paths, and that corresponds to a field of the same name as the application information descriptor. A selector_byte (selector byte) is an area in which a syntax is prescribed for each protocol ID and in which an acquisition location is written.

FIG. 23 shows a configuration example of a selector byte 2300 common to the HTTP/HTTPS and MMT non-timed transmission.

A URL_base byte stores text information, which indicates a URL_base out of a URL character string, in a series of areas including as many loops as the number of URL_base_length.

An URL_extension_count indicates the number of URL_extension subsequent to the URL_base, and a loop of URL_extension is disposed by exactly the number of URL_extension_count. In the loop of one URL_extension, the URL_extension_byte stores text information, which indicates the individual URL_extension, in a series of areas including as many loops as the number of URL_extension length that prescribes the length of the URL_extension. Each URL_extension is a URL character string subsequent to the URL_base. For example, when the URL_base is "http://www.xbc.com" and the URL_extension is "index.html", it is possible to couple those character strings and obtain a complete URL "http://xbc.com/index.html".

In short, with reference to the application information descriptor and the transmission protocol descriptor in the loop of the application information in the MH AI table, it is possible to acquire transmission means (MMT transmission or HTML transmission) and location information (URL) of the application.

Figure 24:
FIG. 24 is a diagram showing a configuration example of a data transmission message as one signaling message.

FIG. 24 shows a configuration example of a data transmission message 2400 as one signaling message. Hereinafter, the meanings of respective parameters of the data transmission message will be described.

A message_id (message identification) is a 16-bit fixed value for identifying a data transmission message in various types of signaling information. In this embodiment, 0xF000 is set. A version (version) is an area in which a version number of a data transmission message is written. A length (message length) is a parameter of 32 bits, which indicates the size of data of that message subsequent to this field in terms of bytes.

A num_of_tables (number of tables) indicates the number of tables stored in the data transmission message. As tables stored in the data transmission message, a loop of table information is disposed by the number indicated by exactly the number of num_of_tables.

In a loop of one piece of table information, a table_id (table identification), a table_version (table version), and a table_length (table length) are stored as table information. The table_id (table identification) is an area used for identifying a table stored in this data transmission message. In the data transmission message, three types of signaling tables, i.e., a data location management table, a data asset management table, and a data content management table are transmitted (as described above), and the table_id identifies each of those tables. The table_version (table version) indicates a version of a table stored in this data transmission message. The table_length (table length) indicates the size of a table stored in this data transmission message in terms of bytes. A table (table) indicates a table stored in this data transmission message.

Further, the loop of the table is disposed by exactly the number of num_of_tables. In the loop of one table, information of content of a table identified by the table_id is stored.

FIG. 25 shows a configuration example of a data asset management table 2500 that is transmitted by the data transmission message. The data asset management table is a table that manages information of an asset of file data transmitted as MMTP packets and information of items included in each asset of the file data. Hereinafter, the meanings of respective parameters of the data asset management table will be described.

A table_id (table identification) is an 8-bit fixed value that indicates a data asset management table in various types of signaling information. In this embodiment, 0xA2 is set. A version (version) is a parameter of an 8-bit integer value, which indicates a version of this data asset management table. For example, when some parameters constituting the data asset management table are updated, the version is incremented by +1. A length is a parameter of a 16-bit length, which indicates the size of the data asset management table in terms of bytes, the size being counted immediately after this field.

A number_of_asset is an 8-bit parameter, which indicates the number_of_assets of file data included in the package. The following Asset loop is disposed by exactly the number of number_of_asset, and information of file data for each of the assets is stored.

In one Asset loop, a download_id, information related to an asset (file data) itself, and information related to each item included in that asset are included. The download_id is identification information that is written in an extension header of an MMTP packet that transmits non-timed media (file data) (see FIG. 7).

The information related to an asset itself, which is stored in the Asset loop, includes an asset_ID_scheme, an asset_ID_length, an asset_ID_length, and an asset_ID_byte. The asset_ID_scheme indicate the format of the asset ID. As the format of the asset ID, for example, a UUID (Universal Unique Identifier), a URI (Uniform Resource Identifier), and a GURL (General URL) can be assigned. The asset_ID_length indicates the length of an asset ID byte in terms of bytes. The asset_ID_byte indicates an asset ID in a series of areas including as many loops as the number of asset_ID_length, in the format specified by the asset_ID_scheme. Incidentally, in this embodiment, this information is used as information for identifying an asset in common to the MP table and the data asset management table, but due to the large data amount thereof, other substitutable asset identification information may be used. For example, it is assumed that a 16-bit component_tag is defined as information corresponding to the asset_ID in the MP table, and the component_tag is used instead of the asset_ID in the data asset management table.

A number_of_items is an area in which the number of items constituting an asset of appropriate file data is written. The loops of the items are disposed by exactly the number of number_of_items, and pieces of information on the respective items constituting the asset (file data) are written therein.

In the loop of one item, parameters of an item_ID, an item_tag, an item_size, an item_version, an item_checksum, and an item_info are described as information related to the item. The item_ID is a 32-bit value, which indicates an ID for identifying the item transmitted by the non-timed MFU. Similarly, the item_tag is information for identifying the item, and is a 16-bit value. As the signaling information, a 16-bit item_tag is used instead of a 32-bit item_ID, so that a bit size necessary to identify the item can be reduced. The item_size indicates the size of the item in terms of bytes. The item_version indicates a version of the item. The version is incremented by +1 every time details of the item are updated. The item_checksum indicates a checksum of the item. It is thought that the information amount of the checksum becomes large if a checksum is set for all files without fail. Therefore, in consideration thereof, for example, it may be possible to set a 1-bit check_sum_flag and, only when 1 is substituted therefor, to provide a 32-bit item_check_sum. Alternatively, a checksum as a type may be indicated not as signaling but as the extension header of the MMTP packet shown in FIG. 7, and a 32-bit checksum may be disposed after the length. The item_info_length indicates the size of an information area of an item_info_byte in terms of bytes. The item_info_byte stores information on the item in a series of areas including as many loops as the number of item_info_length.

A descriptor_loop_length indicates the total byte length of a descriptor. The descriptor stores information on a descriptor in a series of areas including as many loops as the number of descriptor_loop_length. The descriptor to be stored is defined separately.

In short, the data asset management table 2500 is a table that manages information on an asset of file data (content) included in one package and on items included in the asset. As the information on an item, version information of the item is also managed. With reference to the data asset management table 2500, an appropriate asset_id, a download ID described in the extension header of the MMT that transmits the asset, and the item_info can be drawn from the item_tag (or Item_ID), or the item_ID or item_info on the transmission path of the file data can be drawn from the item_tag handled on the transmission path of the signaling information.

FIG. 26 shows a configuration example of a data location management table (DLMT) 2600 that is transmitted by the data transmission message. The data location management table is a table that manages location information of each piece of file data transmitted as MMTP packets, and location information of each item included in the file data. Hereinafter, the meanings of respective parameters of the data location management table will be described.

In a table_id (table identification), an 8-bit fixed value that indicates a data location management table in various types of signaling information is written. A version_ (version) is a parameter of an 8-bit integer value, which indicates a version of the data location management table. For example, when some parameters constituting the data location management table are updated, the version is incremented by +1.

A length is a parameter of a 16-bit length, which indicates the size of the data location management table in terms of bytes, the size being counted immediately after this field.

A base_URL_length indicates the size of an information area of a base_URL_byte in terms of bytes. The base_URL_byte stores location information, which is described in an absolute URL format of the file data, in a series of areas including as many loops as the number of base_URL_length.

A number_of_items is an area in which the number of items included in the file data is written. The loops of the items are disposed by exactly the number of number_of_items.

In the loop of one item, an item_tag and an item_URI_byte on each item included in the file data are written. The item_tag represents information for identifying an item transmitted by the non-timed MFU in 16 bits, which is shorter than the 32-bit item_ID (as described later). The item_URI_byte stores location information, which is described in a relative URL format with respect to the location information to be the base of the file data, i.e., the base_URL_byte, in a series of areas including as many loops as the number of number_of_item_URI_byte. For example, when the base_URL of content is "http://www.xbc.com" and the item_URL of a certain item is "index.html", it is possible to couple those character strings and obtain a complete URL "http://xbc.com/index.html".

In short, the data location management table 2600 is a table that manages location information on file data (content) included in one package and on an items included in the file data. With reference to the data location management table 2600, a URL of an item can be drawn from the item_tag thereof, or inversely an appropriate item_tag can be drawn from the URL. It should be noted that when a complicated directory structure is further set under the location (directory) indicated by the base_URL, the information amount of the item_URI_byte may become too large in this configuration example. In consideration thereof, in the data location management table, the following structure may be provided: location information of a directory in which a file exists is set as a node_URL, each directory is provided with a node_tag of identification information, and only a file name and the node_tag are specified as information of each item.

Further, FIG. 27 shows a configuration example of a data content management table (DCMT) 2700 that is transmitted by the data transmission message. The data content management table is a table that manages information on file data, that is, content (data broadcasting application) transmitted as non-timed media. Hereinafter, the meanings of respective parameters of the data content management table will be described.

In a table_id (table identification), an 8-bit fixed value that indicates a data content management table in various types of signaling information is written. A version_ (version) is a parameter of an 8-bit integer value, which indicates a version of this data content management table. For example, when some parameters constituting the data content management table are updated, the version is incremented by +1. A length is a parameter of a 16-bit length, which indicates the size of the data content management table in terms of bytes, the size being counted immediately after this field.

A number_of_content is an 8-bit parameter, which indicates the number of content included in the package. (The content is, for example, file data such as an HTML document in which a data broadcasting application is described). The following loop of content is disposed by exactly the number of number_of_content, and information for each piece of content is stored.

In the loop of one piece of content, a content_ID, a content_version, a content_cache_size, and information on an application presentation unit (PU) included in the content are written as information on the content. The content_ID is identification information of the content. The content_version indicates a version of the content. The content_cache_size indicates the size for caching the content.

A number_of_PU is the number of application presentation units (PU) included in the content. The loops of the PU are disposed by exactly the number of number_of_PU.

In the loop of one PU, a PU_tag that is identification information of the PU and a PU_cache_size that indicates the size for caching the PU are written. Further, in the loop of the PU, a number_of_items that indicates the number_of_items included in an appropriate PU, and loops of items corresponding to the number of number_of_items are disposed. In the loop of one item, an item_tag of an item is written.

Further, in the loop of one PU, a number_of_linked_PU that indicates the number of other Pus linked from this PU, and loops of linked_PU corresponding to the number of number_of_linked_PU are disposed. In the loop of one linked_PU, a linked_PU_tag that is identification information of the linked_PU is written.

In short, the data content management table 2700 is a table that manages each piece of content (data broadcasting application) in one package in the application presentation unit (PU). With reference to the data content management table 2700, an application presentation unit (PU)_tag including an item can be acquired from the item_tag thereof. It should be noted that in this configuration example, a hierarchical structure of the data content, the PU, and the item is provided, but when general data content other than applications using a cache is assumed, two layers of the data content and the item may be provided, and the PU_tag may be specified as information for each item. Further, a method of setting similar information for the data asset management table without using the data content management table is also conceived. In this case, equivalent information is expressed by a descriptor that can be disposed in an item_info( ) of the data asset management table shown in FIG. 25. Specifically, it is possible to specify one or more content_ID and PU_tag, to which the item should belong, as a data management descriptor, for example.

Figure 28:
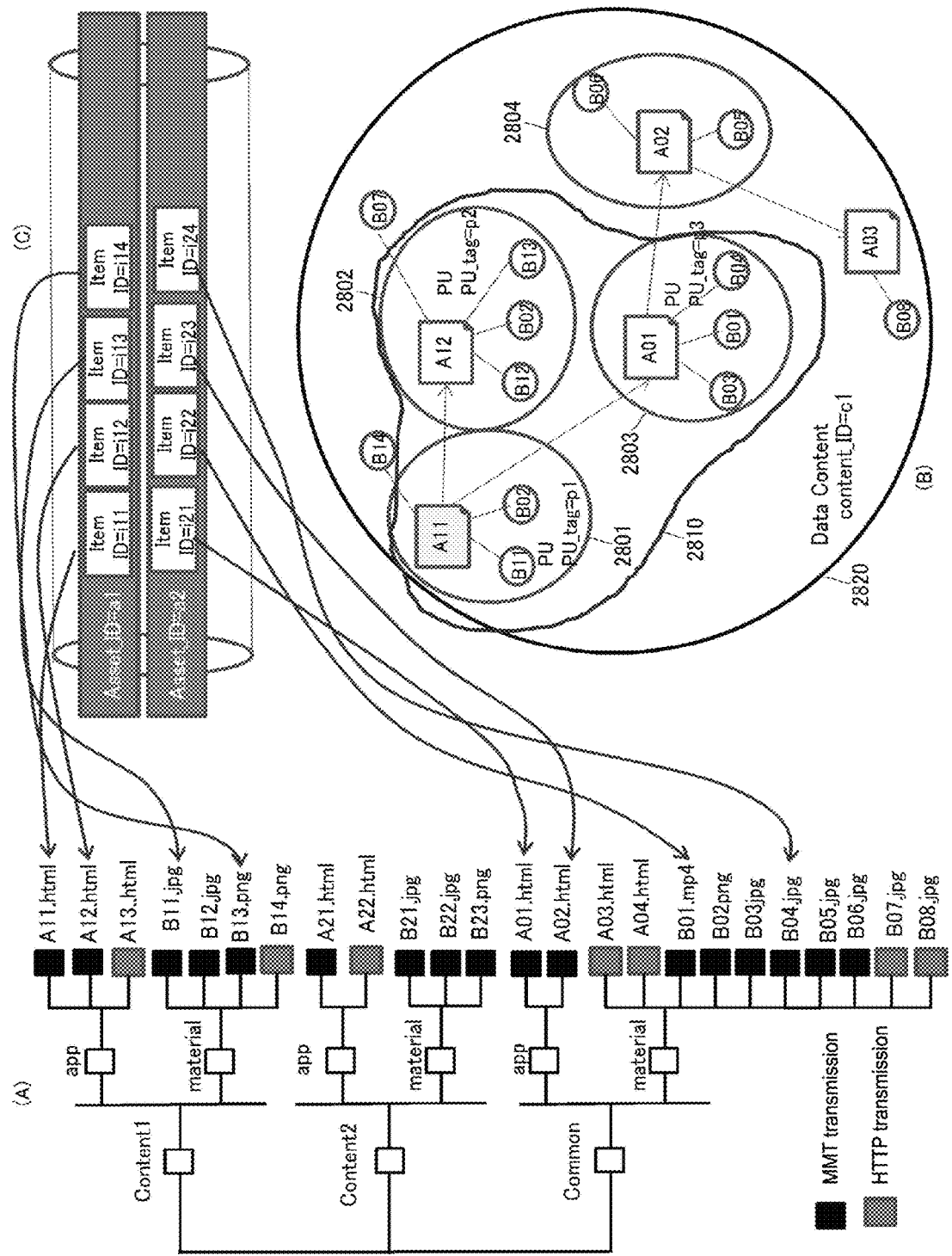
FIG. 28 is a diagram for describing a mechanism to perform transmission, location, and presentation of an MMT-transmitted data broadcasting application (content).

FIG. 28 illustrates a mechanism to perform transmission of an MMT-transmitted data broadcasting application (content), location of content, and presentation of an application.

FIG. 28(A) shows a directory structure of content. Each piece of content 1, 2, . . . is constituted by an application (app) and a material. The application and the material are resources each of which is in fact file data. Each resource corresponds to an item as a constituent element of an asset on an MMT transmission path and can be identified by the item_ID. As shown in FIG. 28(C), each resource is transmitted as an item on an MMT transmission path of an appropriate asset (that will be described later). The application is constituted by one or more HTML documents, which are referred to when content is executed (when an application is presented). Further, the material is a jpeg image that is referred to from the HTML document, another type of mono media data, or the like. One HTML document and a material referred to therefrom constitute one application presentation unit (PU). In the example shown in FIG. 28(A), the content 1 includes one or more HTML documents such as A11.html, A12.html, and A13.html, as resources of the application. Of those, the A11.html is a resource that is directly referred to when the content is executed.

FIG. 28(B) shows a reference relationship between the resources when the content is executed (when the application is presented). In the example shown in the figure, an application A11, which is directly referred to when the content is executed, and materials B11 and B02 referred to by the application A11 constitute a resource group 2801 as one application presentation unit (PU), and p1 is assigned thereto as a PU_tag. (It should be noted that B14 is a material that is not MMT-transmitted by broadcasting but can be acquired as needed by HTTP transmission through communication. Hereinafter, the B14 is considered to be excluded from the resource group of the application presentation unit p1.)

Similarly, an application A12 and materials B12, B02, and B13 referred to by the application A12 constitute a resource group 2802 as one application presentation unit (PU), and p2 is assigned thereto as a PU_tag. (It should be noted that B07 is a material that is not MMT-transmitted by broadcasting but can be acquired as needed by the HTTP transmission through communication. Hereinafter, the B07 is considered to be excluded from the resource group of the application presentation unit p2.) Similarly, an application A01 and materials B03, B01, and B04 referred to by the application A01 constitute a resource group 2803 as one application presentation unit (PU), and p3 is assigned thereto as a PU_tag.

Further, a link reference relationship can be provided among a plurality of HTML documents (which is widely known). In the example shown in FIG. 28(B), the resource A11.html is an HTML document that is directly referred to when the content is executed and that describes an application presentation screen displayed first. In contrast to this, each of the resource A12.html included in the same content 1, and the resource A01.html included in a common out of the content 1 is an HTML document that describes an application presentation screen, to which the screen presented when the A11.html is executed is transferred. The resource A12.html and the resource A01.html have the link reference relationship with the A11.html. The resources A11.html, A12.html, and A01.html form the resource groups 2801, 2802, and 2803, respectively, each of which constitutes one application presentation unit (PU). The application presentation units 2801, 2802, and 2803 linked to one another constitute a higher-order, larger resource group 2810.

Further, a larger resource group in the whole of content, i.e., the whole of data content, which is to be the whole of applications included in a package (one broadcast program), is constituted. The whole of data content is a range of the application presentation units (PU) having a common content_ID. When the loop of the PU of an appropriate content_ID is executed in the data content management table, all the application presentation units (PU) included in the content can be collectively specified. In the example shown in FIG. 28(B), the applications included in the content 1 and the common form a resource group 2820 of the whole of content included in the package (one broadcast program).

FIG. 28(C) schematically shows a state where the content is MMT-transmitted. The applications and the materials that are constituent elements of the content are in fact file data and are also called "resources". Each resource corresponds to an item as a constituent element of an asset on the MMT transmission path. In the MMT transmission, each piece of content included in a package is handled as one asset, and an Asset_ID is assigned thereto. In the example shown in the figure, a1 is assigned to the content 1 as the asset_ID. Further, in the MMT transmission, each resource such as the HTML document data and the material is handled as one item, and an Item_ID is assigned thereto. In the example shown in the figure, i11, i12, i13, and i14 are assigned to the respective resources included in the content 1 as the Item_ID.

Further, the resources included in the same content have a common asset_ID and are transmitted on the same MMT transmission path. In the example shown in FIG. 28(C), the items having the Item_ID of i11, i12, i13, and i14 have the same Asset_ID, a1, in common, and are transmitted on the same MMT transmission path. The data location management table as described above is expressed by FIG. 28(A), the data content management table as described above is expressed by FIG. 28(B), and the data asset management table as described above is expressed by FIG. 28(C). Those tables are associated with one another by the item_IDs.

Figure 29:
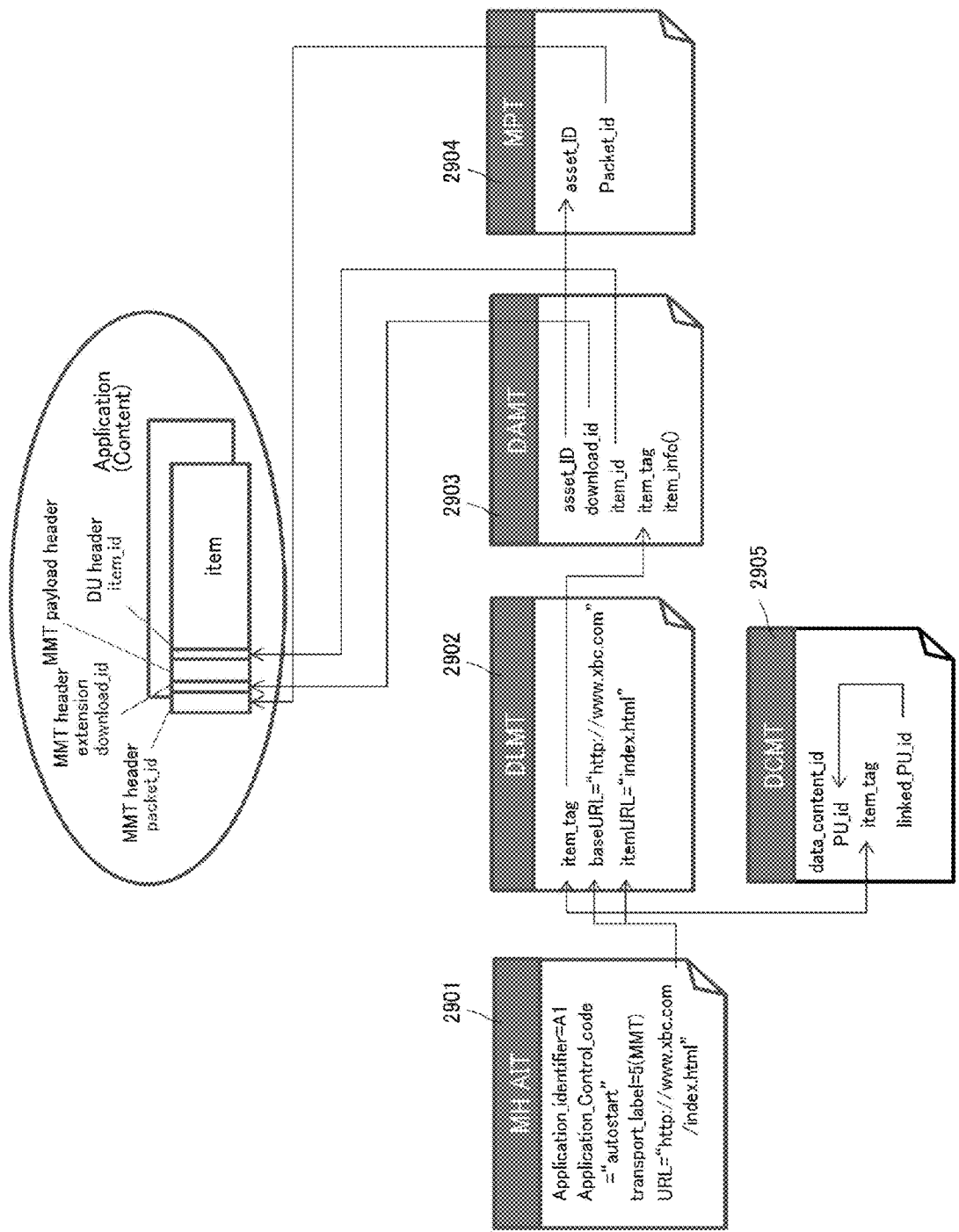
FIG. 29 is a diagram for describing a reference relationship between tables transmitted as signaling information, when a data broadcasting application (content) is acquired from the MMT transmission paths.

The reference relationship between the tables transmitted as signaling information, at the time a data broadcasting application (content) is acquired from the MMT transmission path, will be described with reference to FIG. 29.

When acquiring an MH-AI table (MH AIT) 2901 in the M2 section message, the receiver refers to the application_control_code to confirm how the state of the application is controlled. When "autostart" is instructed, the receiver refers to the transport_protocol_label in the table. When confirming that the MMT transmission is specified, the receiver extracts URL information of an item (file data), which is directly referred to when the application is presented, from a transmission protocol descriptor. The receiver then refers to a data location management table (DLMT) 2902 transmitted by the data transmission message, and can acquire an item_tag of an item corresponding to a combination of a base_URL and an item_URL in the table.

Next, the receiver refers to a data asset management table (DAMT) 2903 transmitted by the data transmission message. The receiver returns the acquired item_tag to an item_ID on the MMT transmission path and specifies a corresponding asset, to acquire an asset_ID and a download_id thereof.

The receiver then refers to an MP table (MPT) 2904 transmitted by the PA message. When acquiring a packet_id corresponding to the acquired asset_ID, the receiver can perform filtering on the MMT transmission path of the file data on the basis of the packet_id in the header of the MMTP packet, the download_id in the extension header, and the item_ID in the DU header, to acquire a desired item (directly referred to when the application is presented).

Further, the receiver can draw the item_tag, which is acquired from the data location management table 2902, in a data content management table (DCMT) 2905 transmitted by the data transmission message, to extract a PU_tag of an appropriate application presentation unit. Further, when the loop of a linked_PU is executed within the loop of the PU of the PU_tag, PU_tags of other application presentation units linked to the PU_tag can be collectively extracted.

In the digital broadcasting system in which the MMT is adopted as a transport system, when an application such as HTML document data is transmitted as non-timed media, it is assumed that the receiver side acquires an application body and a mono media file being referred to, in both paths of broadcasting (MMT transmission) and communication (HTTP transmission).

In the receiver, in order to enable a rapid response when an application is executed (for example, when a "d" button is pushed in a remote controller to display data broadcasting on a screen or when a screen is transferred), it is desirable to previously receive and cache a necessary resource (item, file data). File data capable of being acquired by communication (HTTP transmission) can be acquired almost instantaneously. Meanwhile, file data is repeatedly transmitted in a broadcast stream (MMT transmission), and when an available bandwidth is limited, for example, there is a possibility that it takes a long time to receive the next file data after the execution of an application is instructed and a rapid response cannot be made. For that reason, it is necessary to pre-cache, particularly, file data acquired by the broadcast stream.

In this regard, in the technology disclosed in this specification, in order that the broadcasting transmission system side can acquire resources (items) constituting an application from an arbitrary location of broadcasting and communication, information for mapping a URL, which indicates a location in an application, on a location on the MMT transmission path of broadcasting or the like, and information indicating a unit of display and a link relationship in the application are transmitted by the signaling message (data transmission message).

As described with reference to FIGS. 19 to 23, in the MH AI table, the application transmitting method (transport_protocol_label) and the URL information indicating a location are described. Meanwhile, as described with reference to FIG. 26 and the like, in the data location management table, a correspondence relationship between the URL indicating a location in the application and the item_tag on the data transmission message is described. Further, as described with reference to FIG. 25 and the like, in the data asset management table, a correspondence relationship between the item_tag, the asset_ID of an asset including that item, the download_id and the item_ID of an MMTP packet on the MMT transmission path of that asset is described. As described with reference to FIG. 16 and the like, the asset_ID is drawn in the MP table, and the packet_id of a packet that transmits that asset on the MMT transmission path can thus be acquired. Therefore, in this embodiment, the broadcasting transmission system can transmit the information for mapping a URL, which indicates a location in the application, on a location on the MMT transmission path such as broadcasting, using the MH AI table, the data location management table, the data asset management table, and the MP table that are transmitted by the signaling message.

Further, as described with reference to FIG. 27 and the like, in the data content management table, the information on an application presentation unit is managed for each piece of content included in the package. Specifically, the data content management table describes the PU_id of the application presentation unit included in the content, the item_tag of all items included in the application presentation unit, and the PU_id (linked_PU_id) of other application presentation units linked thereto. Further, as shown in FIG. 25, the data asset management table manages the size of all items included in the asset (item_size) in association with the item_tag. Therefore, in this embodiment, the broadcasting transmission system can transmit the information indicating a unit of display and a link relationship in the application, using the data asset management table and the data content management table.

Further, this embodiment adopts a mechanism to manage information on an asset of an application (file data) in the package and items included in the asset by the data asset management table, manage location information on content in the package and items included in the content by the data location management table, and manage items (resources) included in the content in the application presentation unit by the data content management table.

Therefore, in this embodiment, it is possible to provide an application transmission method by which the degree of freedom of a directory configuration at the time of authoring of the application, the degree of freedom to divide an arbitrary file constituting an application between broadcasting (MMT transmission) and communication (HTTP transmission) transmission paths, and the degree of freedom of a link relationship in the application presentation unit at the time of execution of the application are ensured.

Further, in this embodiment, as described with reference to FIG. 28(B) and the like, the location information and the size related to ranges to access the content can be provided, as hierarchical information, in the following four access ranges (a) to (b).

(a) A resource directly referred to when the application is executed (for example, the A11.html in FIG. 28(B))

(b) A resource group constituting the application presentation unit for simultaneous display (for example, resource groups denoted by reference numbers 2801, 2802, 2803, and 2804 in FIG. 28(B))

(c) A large resource group including the resource group constituting the application presentation unit for simultaneous display and other application presentation units linked thereto (resource group denoted by reference number 2810 in FIG. 28(B))

(d) A resource group of the whole of application (resource group denoted by reference number 2820 in FIG. 28(B))

Therefore, on the receiver side, any of the access ranges (a) to (d) and each size thereof corresponding to the free space of the cache can be grasped on the basis of each table described above, which is transmitted by the signaling message. This enables effective pre-caching of the application.

Figure 30:
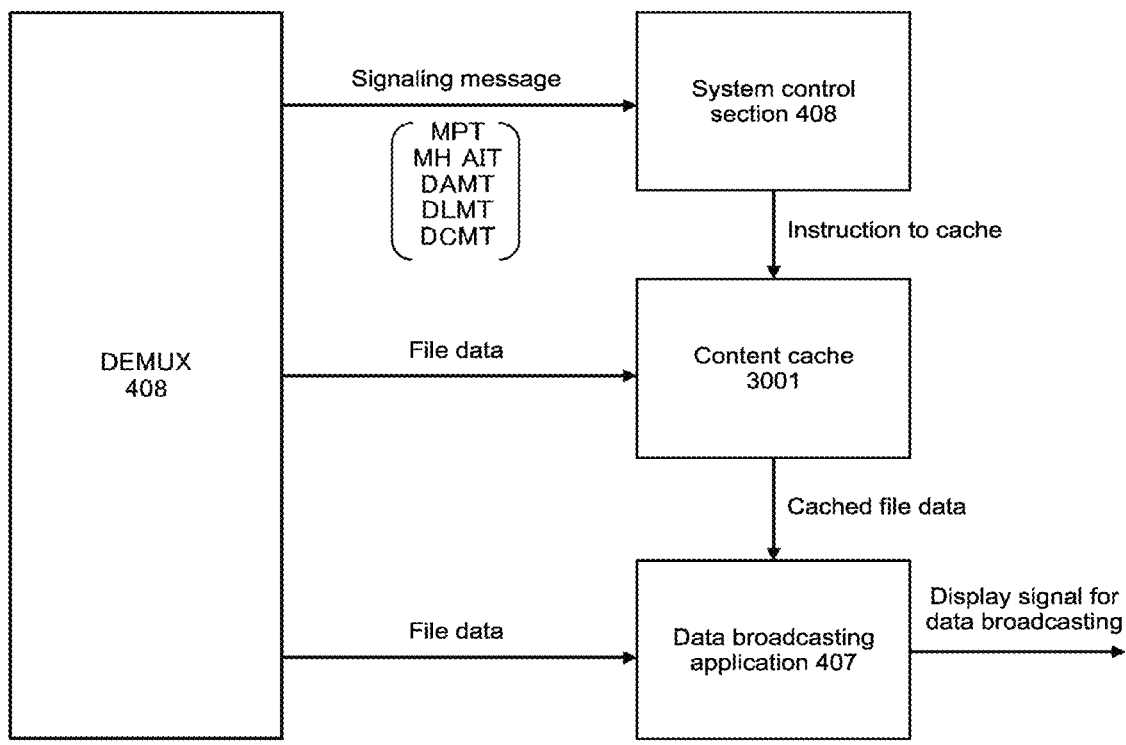
FIG. 30 is a diagram schematically showing a mechanism to pre-cache an application in a receiver.

FIG. 30 schematically shows a mechanism to pre-cache an application, which is processed by a data broadcasting application engine, in the receiver.

Though not shown in FIG. 4, the receiver includes a content cache 3001 that pre-caches content of a data broadcasting application MMT-transmitted by the broadcast signal. Alternatively, the content cache 3001 may be disposed within the data broadcasting application engine 407.

The system control section 408 analyzes the signaling message, which is demultiplexed from the broadcast stream in the demultiplexer 402, and controls an operation inside the receiver. Regarding the pre-caching of the content, the system control section 408 grasps the free space of the content cache 3001 and caches file data in as large an access range as possible.

Specifically, the system control section 408 draws a URL of an item (file data, HTML document data) of an entry specified in the MH AI table transmitted by the M2 section message, in the data location management table transmitted by the data transmission message, and acquires an item_tag of the item referred to. Using the data asset management table and the MP table, an appropriate MMTP packet can be specified from the item_tag, as described above.

Next, the system control section 408 draws the item_tag in the data content management table transmitted by the data transmission message, to acquire an application presentation unit (PU) to which the item referred to belongs, and the size thereof (PU_cache_size), and further acquire another application presentation unit (linked_PU) linked to the above application presentation unit and the size thereof, and content (content_ID) to which the item belongs and the size thereof (content_cache_size). In other words, the system control section 408 grasps the sizes related to the following four access ranges (a) to (d) as hierarchical information.

(a) An item directly referred to in the MH AI table (for example, the A11.html in FIG. 28(B))

(b) An application presentation unit to which the item referred to belongs (for example, reference number 2801 in FIG. 28(B))

(c) An application presentation unit to which the item referred to belongs, and other application presentation units linked thereto (for example, reference number 2810 in FIG. 28(B))

(d) The whole of content (range of content_ID) (for example, reference number 2820 in FIG. 28(B))

The system control section 408 then determines in which one of the access ranges (a) to (d) the item is cached on the basis of the free space of the content cache 3001.

The system control section 408 draws the item_tag of the item to be cached, in the data asset management table transmitted by the data transmission message, and acquires an asset_ID of an asset to which the item belongs. Next, the system control section 408 draws the asset_ID in the MP table transmitted by the PA message, and acquires a packet_id of an MMTP packet by which the asset is transmitted. Further, when acquiring a download_id from the data asset management table, the download_id being described in the extension header of the MMTP packet by which a desired item is transmitted, the system control section 408 performs filtering on the MMT transmission path of the file data on the basis of the packet_id in the header of the MMTP packet, the download_id in the extension header, and the item_ID in the DU header, and acquires an entity of the desired item, to cache the entity of the desired item in the content cache 3001.

Further, when caching is desired in the access range (b), that is, in the application presentation unit to which the item referred to belongs, the system control section 408 specifies an application presentation unit PU to which that item belongs in the data content management table, and then executes a loop of the item within the loop of the PU of the PU_tag, to collectively acquire the item_tag of all items included in the same application presentation unit PU. The system control section 408 then acquires an entity of each item according to the procedure described above on the basis of the item_tag and sequentially caches the entity of each item in the content cache 3001.

Further, when caching is desired in the access range (c), that is, in the application presentation unit to which the item referred to belongs and in other application presentation units linked thereto, the system control section 408 executes a loop of the linked_PU within the loop of the application presentation unit PU to which the item belongs in the data content management table, to collectively acquire the PU_tag of all the application presentation units PU linked to the application presentation unit to which the item referred to belongs. According to the procedure described above, the system control section 408 collectively acquires the item_tag of all the items included in included in each linked_PU. The system control section 408 then acquires an entity of each item according to the procedure described above on the basis of the item_tag and sequentially caches the entity of each item in the content cache 3001.

Further, when caching is desired in the access range (d), that is, in the whole of content (range of content_ID), the system control section 408 the system control section 408 specifies a content_ID of the content to which the item belongs in the data content management table, and then executes a loop of the PU within the loop of the content_id, to collectively acquire the PU_tag of all the application presentation units PU included in the content. The system control section 408 then acquires an entity of each item according to the procedure described above on the basis of the item_tag and sequentially cache the entity of each item in the content cache 3001.

When executing an application, if a necessary item (file data) is already pre-cached in the content cache 3001, the data broadcasting application engine 407 can extract the item from the content cache 3001 without waiting for the arrival of file data demultiplexed from the broadcast stream in the demultiplexer 402, and rapidly respond, to generate a display signal for data broadcasting.

Meanwhile, when a necessary item is not present in the content cache 3001, the data broadcasting application engine 407 waits for the arrival of file data demultiplexed from the broadcast stream, and rapidly responds, to generate a display signal for data broadcasting.

Figure 31:
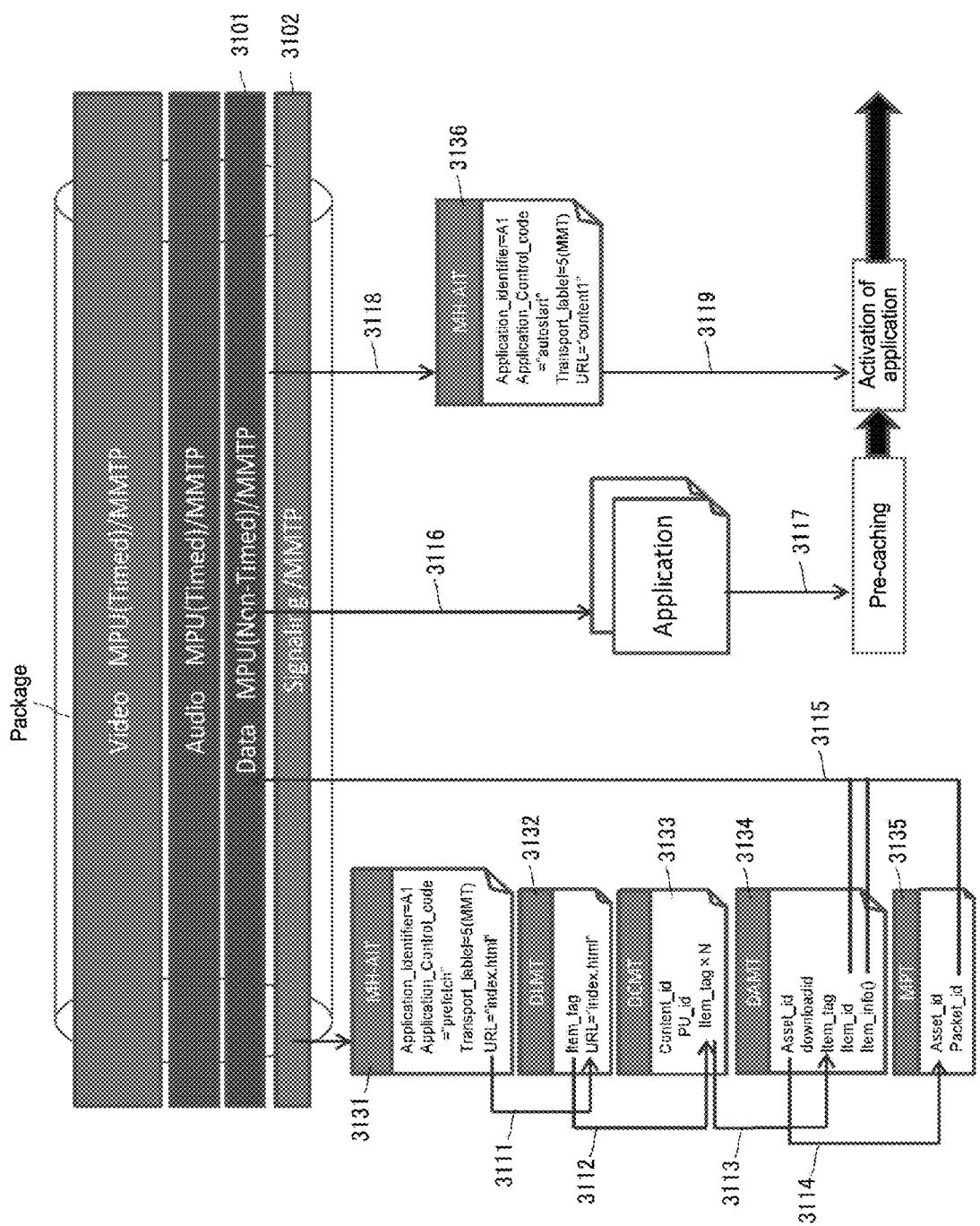
FIG. 31 is a diagram for describing an operation of acquiring an application from a broadcast stream and activating the application in the receiver.

FIG. 31 illustrates an operation of acquiring an application from a broadcast stream and activating the application in the receiver.

The system control section 408 analyzes details of various signaling messages received on an MMT transmission path 3102. The system control section 408 executes a loop of application information in an MH AI table 3131 transmitted by the M2 section message, and refers to information of each application.

When detecting an application whose state is controlled to be "prefetch (prefetching)" in the application_control_code, as indicated by reference number 3111, the system control section 408 draws a URL of an item (file data, HTML document data) of a specified entry in a data location management table 3132 transmitted by the data transmission message, and acquires an item_tag of the item referred to.

Next, as indicated by reference number 3112, the system control section 408 draws the item_tag in a data content management table 3133 transmitted by the data transmission message, and specifies an application presentation unit PU to which the item referred to belongs. The system control section 408 then executes a loop of the item within the loop of the PU, and sequentially acquires an item_tag of each item that belongs to the same application presentation unit PU.

Next, as indicated by reference number 3113, the system control section 408 draws each item_tag in a data asset management table 3134 and acquires an asset_ID of an asset to which the item belongs.

Next, as indicated by reference number 3114, the system control section 408 draws the asset_ID in an MP table 3135 transmitted by the PA message and acquires a packet_id of an MMTP packet by which the asset is transmitted.

As indicated by reference number 3115, when drawing the item_tag in the data asset management table 3134 and acquiring an item_ID on the MMT transmission path and a download_id described in the extension header of an MMTP packet by which a desired item is transmitted, the system control section 408 performs filtering on an MMT transmission path 3101 of file data on the basis of the packet_id in the header of the MMTP packet, the download_id in the extension header, and the item_ID in the DU header, and acquires an item of the desired application as indicated by reference number 3116. The acquired item of the application is sequentially pre-cached in the content cache 3001 as indicated by reference number 3117.

When executing pre-caching, as described above, the system control section 408 acquires the ranges to access hierarchical file data when a data broadcasting application is executed, and the location information and the size of file data in each access range, to effectively cache the application in accordance with the free space of the cache.

After that, as indicated by reference number 3118, the system control section 408 refers to details of a received MH AI table 3136. When detecting an application whose state is controlled to be "autostart (automatic start)" in the application_control_code, as indicated by reference number 3119, the data broadcasting application engine 407 activates an application "A1" specified by an application identifier (application_identifier) thereof. At that time, if the file data constituting the application is pre-cached, the file data can be downloaded therefrom and the application can be rapidly activated.

Figure 32:
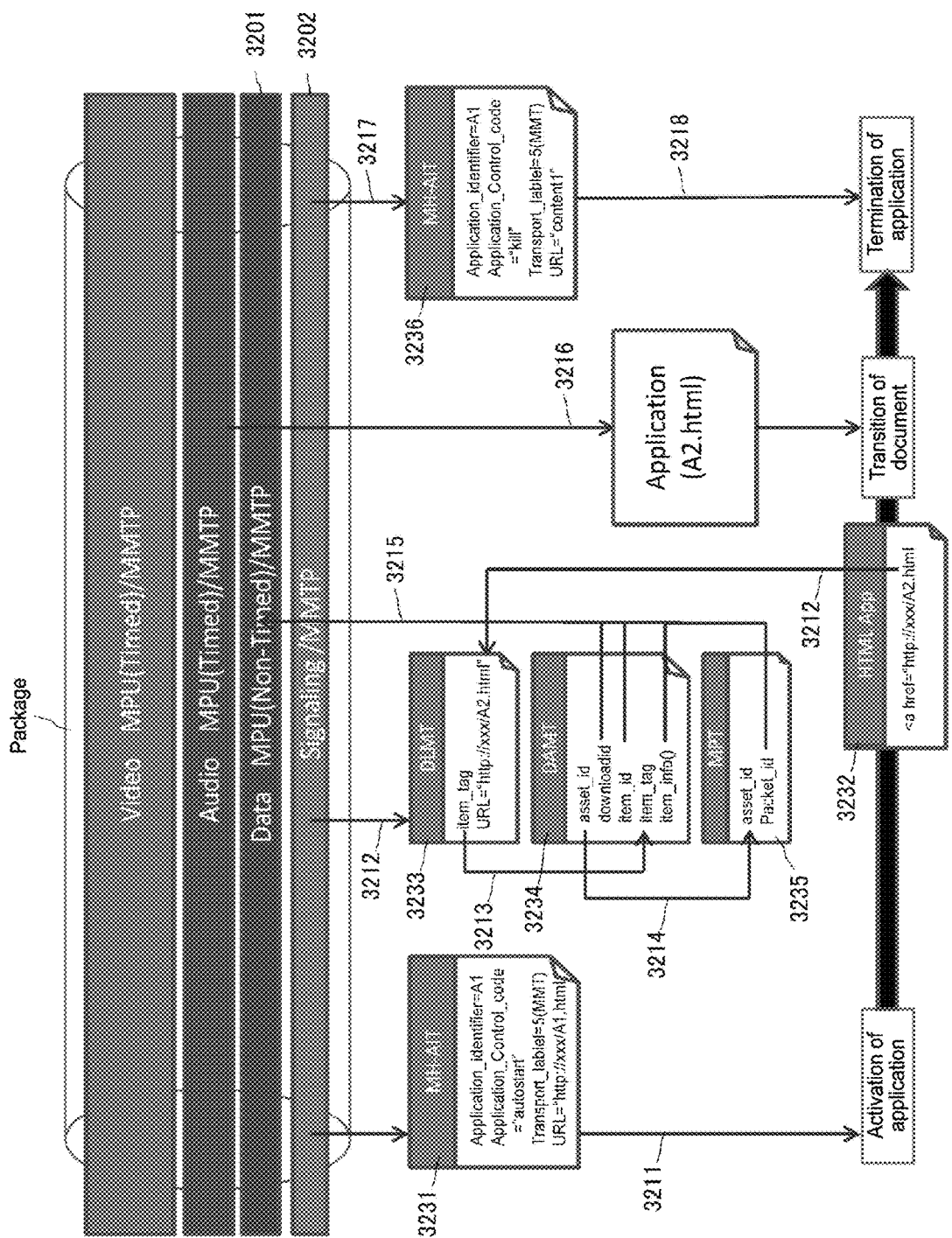
FIG. 32 is a diagram for describing an operation when an application presentation screen is transferred in the receiver.

Further, FIG. 32 illustrates an operation when an application presentation screen is transferred in the receiver.

The system control section 408 analyzes details of various signaling messages received on an MMT transmission path 3202. The system control section 408 executes a loop of application information in an MH AI table 3231 transmitted by the M2 section message, and refers to information of each application.

When detecting an application for which "autostart (automatic start)" is instructed in the application_control_code, as indicated by reference number 3211, the system control section 408 instructs the data broadcasting application engine 407 to activate an application "A1" specified by an application_identifier (application_identifier) thereof. Here, it is assumed that an item of the application "A1" is not pre-cached at all or that only an item of an entry is pre-cached.

Here, as indicated by reference number 3232, it is assumed that the activated HTML application refers to another item (resource) specified by a URL "http://xxx/A2.html", that is, HTML document data "A2.html".

In such a case, as indicated by reference number 3212, the system control section 408 draws that URL in a data location management table 3233 transmitted by the data transmission message and acquires an item_tag of the item referred to.

Next, as indicated by reference number 3213, the system control section 408 draws that item_tag in a data asset management table 3234 transmitted by the data transmission message and acquires an asset_ID of an asset to which the item "A2.html" belongs.

Next, as indicated by reference number 3214, the system control section 408 draws the asset_ID in an MP table 3235 transmitted by the PA message and acquires a packet_id of an MMTP packet by which the asset is transmitted.

As indicated by reference number 3215, when drawing the item_tag in the data asset management table 3234 and acquiring an item_ID on the MMT transmission path and a download_id described in the extension header of an MMTP packet by which a desired item is transmitted, the system control section 408 performs filtering on an MMT transmission path 3201 of the file data on the basis of the packet_id in the header of the MMTP packet, the download_id in the extension header, and the item_ID in the DU header, and acquires the desired item "A2.html" as indicated by reference number 3216. However, when the item "A2.html" is pre-cached, it is not necessary to receive the item from the MMT transmission path 3201. The data broadcasting application engine 407 then executes the application "A2.html", and as a result, a screen of a presented document is transferred.

After that, as indicated by reference number 3217, the system control section 408 refers to details of a received MH AI table 3236. When detecting that "kill (terminate)" is instructed for the item "A1" of the entry in the application_control_code, as indicated by reference number 3218, the system control section 408 instructs the data broadcasting application engine 407 to terminate the application.

Figure 33:
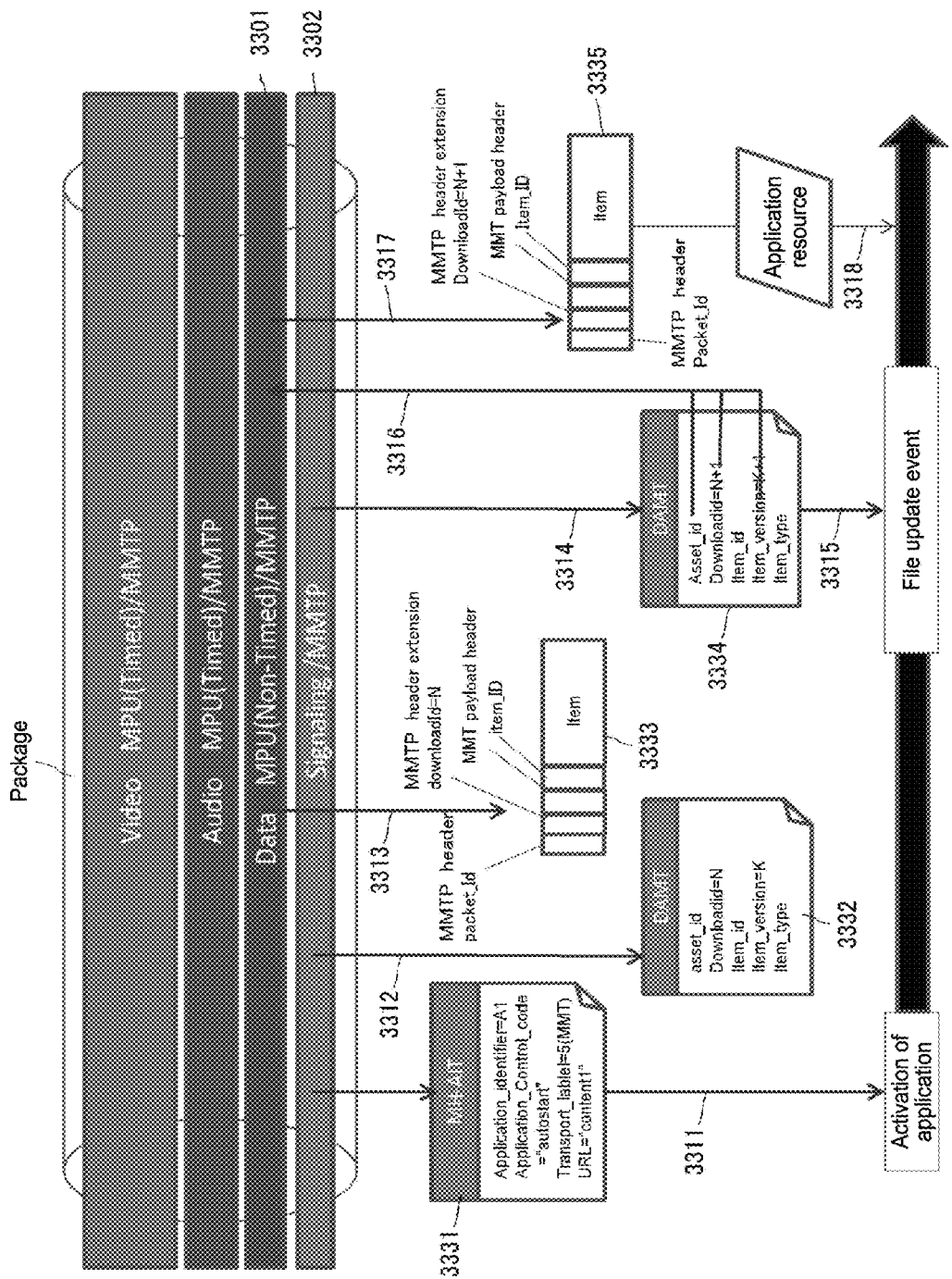
FIG. 33 is a diagram for describing an operation when file data of an application is updated in the receiver.

Further, FIG. 33 illustrates an operation when file data of an application is updated in the receiver.

The system control section 408 analyzes details of various signaling messages received on an MMT transmission path 3302. The system control section 408 executes a loop of application information in an MH AI table 3331 transmitted by the M2 section message, and refers to information of each application.

When detecting an application for which "autostart (automatic start)" is instructed in the application_control_code, as indicated by reference number 3311, the system control section 408 instructs the data broadcasting application engine 407 to activate an application "A1" specified by an application_identifier (application_identifier) thereof.

After that, as indicated by reference number 3312, the system control section 408 refers to a data asset management table 3332 transmitted by the data transmission message. As indicated by reference number 3313, the system control section 408 performs filtering on an MMT transmission path 3301 of the file data on the basis of a packet_id in the header of an MMTP packet, a download_id (=N) in the extension header, and an item_ID in the DU header according to the procedure described above, and acquires an appropriate MMTP packet 3333 as indicated by reference number 3313. Description on the processing of executing the item transmitted by the MMTP packet 3333 will be omitted.

The data asset management table 3332 indicates item_version=K, as version information of the item. The system control section 408 manages the version information of this item.

As indicated by reference number 3314, the system control section 408 refers to a data asset management table 3334 of a data transmission message received later. When detecting that the item_version of the same item_id is updated from K to K+1, as indicated by reference number 3315, the system control section 408 notifies the data broadcasting application engine 407 of a file update event.

Further, as indicated by reference number 3316, the system control section 408 performs filtering on the MMT transmission path 3301 of the file data on the basis of a packet_id in the header of an MMTP packet, the updated download_id (=N+1), and the item_ID in the DU header, and acquires an MMTP packet 3335 by which the item whose version is updated to K+1 is transmitted, as indicated by reference number 3317. As indicated by reference number 3318, the acquired item is provided to the data broadcasting application engine 407 as a resource of the application, so that the screen of the document is transferred.

As described above, in the broadcasting system to which the technology disclosed in this specification is applied, in order that resources (items) constituting an application can be acquired from an arbitrary location of broadcasting and communication, information for mapping a URL, which indicates a location in an application, on a location on the MMT transmission path of broadcasting or the like, and information indicating a unit of display and a link relationship in the application can be transmitted.

Further, the technology disclosed in this specification provides an application transmission method by which the degree of freedom of a directory configuration at the time of authoring of an application, the degree of freedom to divide an arbitrary file constituting the application between broadcasting and communication transmission paths, and the degree of freedom of a unit of display when the application is executed, and a link relationship can be ensured.

Further, according to the technology disclosed in this specification, the location information and the sizes related to the access ranges can be provided as hierarchical information from the transmission side of the broadcast stream, in the four access ranges, i.e., a resource directly referred to in the application, a resource group constituting the application presentation unit of simultaneous display, a resource group including the above resource group and other application presentation units linked thereto, and a resource group of the whole of application. As a result, on the reception side, effective pre-caching can be performed in accordance with an available cache size.

INDUSTRIAL APPLICABILITY

Hereinabove, the technology disclosed in this specification has been described in detail with reference to the specific embodiment. However, it is obvious that modifications and substitutions can be made to the embodiment by those skilled in the art without departing from the gist of the technology disclosed in this specification.

The technology disclosed in this specification can be applied to various broadcasting systems in which the MMT is adopted as a transport system. Further, the technology disclosed in this specification can be applied to various transmission systems in which both of timed media and non-timed media are transmitted.

In short, the technology disclosed in this specification has been described as an illustrative embodiment, and the details described in this specification should not be construed as limiting. To determine the gist of the technology disclosed in this specification, the scope of claims should be considered.

It should be noted that the technology disclosed in this specification can have the following configurations.

(1) A reception apparatus, including:
a reception section that receives a transmitted signal of a predetermined transport system;
a demultiplexer that demultiplexes a received signal into pieces of media data and signaling information; and
a control section that controls caching of at least one of the demultiplexed pieces of media data, on the basis of the demultiplexed signaling information.

(2) The reception apparatus according to (1), in which the predetermined transport system is an MMT.

(3) The reception apparatus according to (1), in which the transmitted signal includes timed media and non-timed media, and
the control section controls caching of the non-timed media.

(4) The reception apparatus according to (1), in which the non-timed media includes pieces of file data, the pieces of file data constituting an asset of a data broadcasting application, and
the control section controls caching of the file data in accordance of a free space of a cache.

(5) The reception apparatus according to (4), in which the control section acquires access ranges to hierarchical file data when the data broadcasting application is executed, and location information and a size of each piece of the file data in each of the access ranges, on the basis of the received signaling information, and controls caching.

(6) The reception apparatus according to (4) or (5), in which
the control section grasps four hierarchical access ranges (a) to (d) and sizes thereof, the access ranges (a) to (d) being
(a) file data directly referred to when an application is executed,
(b) a resource group of file data constituting an application presentation unit for simultaneous display,
(c) a large resource group including the resource group constituting the application presentation unit for simultaneous display and another application presentation unit linked thereto, and
(d) a resource group of the whole of the application, and determines in which one of the access ranges caching is performed in accordance with the free space of the cache.

(7) The reception apparatus according to (6), in which the control section receives first information and second information as the signaling information, the first information mapping a URL on a location on an MMT transmission path of broadcasting or the like, the URL indicating a location in an application, the second information indicating a unit of display and a link relationship in the application, and grasps the four hierarchical access ranges (a) to (d) and the sizes thereof.

(8) The reception apparatus according to (7), in which the reception section receives an application information table, a data location management table, a data asset management table, and an MMT package table as the first information,
the application information table managing an application transmitting method and URL information indicating a location,
the data location management table managing a correspondence relationship between the URL indicating the location in the application and item identification information on a data transmission message,
the data asset management table managing a correspondence relationship between the item identification information, asset identification information of an asset including an item of the item identification information, a download_id of an MMTP packet on the MMT transmission path of the asset, and the item identification information,
the MMT package table managing a correspondence relationship between the asset identification information and packet identification information of a packet transmitting the asset on the MMT transmission path.

(9) The reception apparatus according to (7) or (8), in which
the reception section receives a data content management table as the second information, the data content management table managing identification information of an application presentation unit included in content, item identification information of all items included in the application presentation unit, and identification information of another application presentation unit linked thereto.

(10) The reception apparatus according to any one of (1) to (9), in which
the control section executes cache processing in response to reception of the signaling information related to an application whose state is controlled to be prefetch (prefetching).

(11) A reception method, including:
a reception step of receiving a transmitted signal of a predetermined transport system;
a demultiplex step of demultiplexing a received signal into pieces of media data and signaling information; and a control step of controlling caching of at least one of the demultiplexed pieces of media data, on the basis of the demultiplexed signaling information.

(12) A transmission apparatus, including:
a multiplexer that multiplexes timed media, non-timed media, and a signaling message including information available for cache processing of the non-timed media on a reception side; and
a transmission section that transmits multiplexed packets in a predetermined transport system.

(13) The transmission apparatus according to (12), in which
the predetermined transport system is an MMT.

(14) The transmission apparatus according to (12) or (13), in which
the non-timed media includes pieces of file data, the pieces of file data constituting an asset of a data broadcasting application, and
the signaling message includes first information and second information, the first information mapping a URL on a location on an MMT transmission path of broadcasting or the like, the URL indicating a location in an application, the second information indicating a unit of display and a link relationship in the application.

(15) The transmission apparatus according to (14), in which
the first information includes an application information table, a data location management table, a data asset management table, and an MMT package table,
the application information table managing an application transmitting method and URL information indicating a location,
the data location management table managing a correspondence relationship between the URL indicating the location in the application and item identification information on a data transmission message,
the data asset management table managing a correspondence relationship between the item identification information, asset identification information of an asset including an item of the item identification information, a download_id of an MMTP packet on the MMT transmission path of the asset, and the item identification information,
the MMT package table managing a correspondence relationship between the asset identification information and packet identification information of a packet transmitting the asset on the MMT transmission path.

(16) The transmission apparatus according to (14) or (15), in which
the second information includes a data content management table, the data content management table managing identification information of an application presentation unit included in content, item identification information of all items included in the application presentation unit, and identification information of another application presentation unit linked thereto.

(17) A transmission method, including:
a multiplex step of multiplexing timed media, non-timed media, and a signaling message including information available for cache processing of the non-timed media on a reception side; and
a transmission step of transmitting multiplexed packets in a predetermined transport system.

DESCRIPTION OF SYMBOLS 10 digital broadcasting system
11 broadcasting transmission system
12 receiver
301 clock section
302 signal transmitting section
303 video encoder
304 audio encoder
305 caption encoder
306 signaling encoder
307 file encoder
308 information system
309 TLV signaling encoder
310 IP service multiplexer
311 TLV multiplexer
312 modulation/transmission section
401 tuner/demodulation section
402 demultiplexer
403 clock section
404 video decoder
405 audio decoder
406 caption decoder
407 data broadcasting application engine
408 system control section
409 synthesis section

The invention claimed is:

1. A transmission apparatus, comprising:
at least one processor configured to:
generate a signaling message on each of assets including timed media and non-timed media; and
transmit packets in a predetermined transport system, wherein the packets store the signaling message,
wherein the non-timed media includes items corresponding to files or directories, the files or directories constitute an asset of an application,
wherein the signaling message includes a first table indicating presentation unit identification information and item tag information, the presentation unit identification information identifies a presentation unit of the application in the non-timed media, and the item tag information separately identifies each of a plurality of items included in the presentation unit,
wherein the signaling message further includes a second table indicating item identification information, the item identification information identifies an item on a transport stream, and the item identification information corresponds to the item tag information separately identifying each of the plurality of items included in the presentation unit, and
wherein the second table further indicates asset identification information, the asset identification information identifies an asset including an item, and assets of a same type share a common asset identification information, wherein the asset identification information is different from the item identification information,
wherein the assets of the same type constitute a package along with assets of different types, wherein each of the assets of the different types is a set of one or more media processing units (MPUs) sharing the common asset identification information, and transmitted through each dedicated elementary stream (ES) of a respective one of a plurality of transmission paths such that: (i) in a first transmission path, packets of video constituted by a first MPU logical group having a first common asset identification information are transmitted; (ii) in a second transmission path, packets of audio constituted by a second MPU logical group having a second common asset identification information are transmitted; and (iii) in a third transmission path, packets of file data constituted by a third MPU logical group having a third common asset identification information are transmitted.

2. The transmission apparatus according to claim 1, wherein the predetermined transport system is an MMT (MPEG (Moving Picture Experts Group) Media Transport).

3. The transmission apparatus according to claim 2, wherein
the first table further indicates link-destination presentation unit identification information, and
the link-destination presentation unit identification information identifies another application presentation unit linked to the presentation unit of the application.

4. The transmission apparatus according to claim 1, wherein in a fourth transmission path, packets including at least one signaling message are repeatedly transmitted, wherein the at least one signaling message includes a first type signaling message including an Moving Picture Experts Group (MPEG) Media Transport (MMT) Package (MP) table, a second type signaling message including an application information table, and a third type signaling message including a data location management table, a data asset management table, and a data content management table.

5. A transmission method, comprising:
generating, by a message generating section of a transmission apparatus, a signaling message on each of assets including timed media and non-timed media; and
transmitting, by a transmission section of the transmission apparatus, packets in a predetermined transport system, the packets storing the signaling message,
wherein the non-timed media includes items corresponding to files or directories, the files or directories constitute an asset of an application,
wherein the signaling message includes a first table indicating presentation unit identification information and item tag information, the presentation unit identification information identifies a presentation unit of the application in the non-timed media, and the item tag information separately identifies each of a plurality of items included in the presentation unit,
wherein the signaling message further includes a second table indicating item identification information, the item identification information identifies an item on a transport stream, and the item identification information corresponds to the item tag information separately identifying each of the plurality of items included in the presentation unit, and
wherein the second table further indicates asset identification information, the asset identification information identifies an asset including an item, and assets of a same type share a common asset identification information, wherein the asset identification information is different from the item identification information,
wherein the assets of the same type constitute a package along with assets of different types, wherein each of the assets of the different types is a set of one or more media processing units (MPUs) sharing the common asset identification information, and transmitted through each dedicated elementary stream (ES) of a respective one of a plurality of transmission paths such that: (i) in a first transmission path, packets of video constituted by a first MPU logical group having a first common asset identification information are transmitted; (ii) in a second transmission path, packets of audio constituted by a second MPU logical group having a second common asset identification information are transmitted; and (iii) in a third transmission path, packets of file data constituted by a third MPU logical group having a third common asset identification information are transmitted.

6. A reception apparatus, comprising:
at least one processor configured to:
receive a transmitted signal of a predetermined transport system, the transmitted signal storing a signaling message on each of assets including timed media and non-timed media; and
control caching of the non-timed media on the basis of the received signaling message, wherein the non-timed media includes items corresponding to files or directories, the files or directories constitute an asset of an application,
control caching of an item in a presentation unit on the basis of a first table and a second table included in the received signaling message,
wherein the first table indicates presentation unit identification information and item tag information, the presentation unit identification information identifies the presentation unit of the application in the non-timed media, and the item tag information separately identifies each of a plurality of items included in the presentation unit,
wherein the second table indicates item identification information, the item identification information identifies an item on a transport stream, and the item identification information corresponds to the item tag information separately identifying each of the plurality of items included in the presentation unit, and
wherein the second table further indicates asset identification information, the asset identification information identifies an asset including an item, and assets of a same type share a common asset identification information, wherein the asset identification information is different from the item identification information,
wherein the assets of the same type constitute a package along with assets of different types, wherein each of the assets of the different types is a set of one or more media processing units (MPUs) sharing the common asset identification information, and transmitted through each dedicated elementary stream (ES) of a respective one of a plurality of transmission paths such that: (i) in a first transmission path, packets of video constituted by a first MPU logical group having a first common asset identification information are transmitted; (ii) in a second transmission path, packets of audio constituted by a second MPU logical group having a second common asset identification information are transmitted; and (iii) in a third transmission path, packets of file data constituted by a third MPU logical group having a third common asset identification information are transmitted.

7. A reception method, comprising:
receiving, by a reception section of a reception apparatus, a transmitted signal of a predetermined transport system, the transmitted signal storing a signaling message on each of assets including timed media and non-timed media and the non-timed media; and
controlling, by a control section of the reception apparatus, caching of the non-timed media on the basis of the received signaling message, wherein the non-timed media includes items corresponding to files or directories, the files or directories constitute an asset of an application, controlling, by the control section of the reception apparatus, caching of an item in a presentation unit on the basis of a first table and a second table included in the received signaling message, wherein the first table indicates presentation unit identification information and item tag information, the presentation unit identification information identifies the presentation unit of the application in the non-timed media, and the item tag information separately identifies each of a plurality of items included in the presentation unit, wherein the second table indicates item identification information, the item identification information identifies an item on a transport stream, and the item identification information corresponds to the item tag information separately identifying each of the plurality of items included in the presentation unit, and wherein the second table further indicates asset identification information, the asset identification information identifies an asset including an item, and assets of a same type share a common asset identification information, wherein the asset identification information is different from the item identification information, wherein the assets of the same type constitute a package along with assets of different types, wherein each of the assets of the different types is a set of one or more media processing units (MPUs) sharing the common asset identification information, and transmitted through each dedicated elementary stream (ES) of a respective one of a plurality of transmission paths such that: (i) in a first transmission path, packets of video constituted by a first MPU logical group having a first common asset identification information are transmitted; (ii) in a second transmission path, packets of audio constituted by a second MPU logical group having a second common asset identification information are transmitted; and (iii) in a third transmission path, packets of file data constituted by a third MPU logical group having a third common asset identification information are transmitted.

* * * * *